(12) United States Patent
Harvey et al.

(10) Patent No.: US 6,519,629 B2
(45) Date of Patent: Feb. 11, 2003

(54) SYSTEM FOR CREATING A COMMUNITY FOR USERS WITH COMMON INTERESTS TO INTERACT IN

(75) Inventors: Jamey Harvey, Reston, VA (US); Andrew Fegly, Falls Church, VA (US); Matt Hulan, Rockville, MD (US); Robert Dekelbaum, Silver Spring, MD (US)

(73) Assignee: iKimbo, Inc., Reston, VA (US)

( * ) Notice: Subject to any disclaimer, the term of this patent is extended or adjusted under 35 U.S.C. 154(b) by 58 days.

(21) Appl. No.: 09/968,386

(22) Filed: Oct. 2, 2001

(65) Prior Publication Data

US 2002/0059379 A1 May 16, 2002

Related U.S. Application Data

(60) Division of application No. 09/513,844, filed on Feb. 25, 2000, which is a continuation-in-part of application No. 09/264,988, filed on Sep. 15, 1998.

(51) Int. Cl.[7] .............................................. G06F 13/00
(52) U.S. Cl. ..................... 709/204; 709/203; 709/217
(58) Field of Search ................................. 709/200, 201, 709/203, 204, 205, 217, 218, 219, 220, 223, 224, 232

(56) References Cited

U.S. PATENT DOCUMENTS

| | | |
|---|---|---|
| 5,600,364 A | 2/1997 | Hendricks et al. ............. 725/9 |
| 5,734,901 A | 3/1998 | Sidhu et al. ................. 712/220 |
| 5,754,939 A | 5/1998 | Herz et al. .................. 455/3.04 |
| 5,796,393 A | 8/1998 | MacNaughton et al. .... 345/733 |
| 5,805,811 A | 9/1998 | Pratt et al. ................... 709/206 |
| 5,867,799 A * | 2/1999 | Lang et al. ..................... 707/1 |
| 6,020,884 A | 2/2000 | MacNaughton et al. .... 345/329 |
| 6,029,195 A * | 2/2000 | Herz .......................... 709/219 |

OTHER PUBLICATIONS

Wutka, Mark et al., "JAVA Expert Solutions", Que Corporation 1997; Chapters 6, 10, 21 and 37.

Fregly, Andrew M., "Mechanisms for Eelectronic Documentation Distribution".

* cited by examiner

Primary Examiner—Moustafa M. Meky
(74) Attorney, Agent, or Firm—Cooley Godward LLP

(57) ABSTRACT

An Information and Application Distribution System (IADS) is disclosed. The IADS operates, in one embodiment, to distribute, initiate and allow interaction and communication within like-minded communities. Application distribution occurs through the transmission and receipt of an "invitation application" which contains both a message component and an executable component to enable multiple users to connect within a specific community. The application object includes functionality which allows the user's local computer to automatically set up a user interface to connect with a central controller which facilitates interaction and introduction between and among users.

32 Claims, 15 Drawing Sheets

SYSTEM FOR CREATING A COMMUNITY FOR USERS WITH COMMON INTERESTS TO INTERACT IN

This application is a divisional application of application Ser. No. 09/513,844, still pending filed Feb. 25, 2000 which is a Continuation-in-Part of application Ser. No. 09/264,988 still pending filed Sep. 15, 1998, the entire content of which is hereby incorporated by reference.

FIELD OF THE INVENTION

This invention relates generally to software and information distribution and control. More particularly, this invention relates to the use of various communications protocols in order to distribute and enable community applications and information through a public or private network to enable users to interact and communicate with like-minded communities.

BACKGROUND OF THE INVENTION

The recent explosion of the Internet is due to many factors. One primary factor is the availability of practically unlimited information. Users can access data about companies, news events, sports, organizations and almost anything else under the sun. Another benefit of the Internet is its inherent ability to permit communication among users. Various standard protocols allow for information and resource exchange through email, chat rooms, as well as Usenet and other bulletin boards. A third major reason for the Internet's growth is the large number of free or low cost software applications which can be accessed through an Internet connection. There is a vast amount of software available on Internet servers which can be downloaded to the user's local computer and executed later. In addition, through on-line stores and other electronic commerce applications, it is possible for Internet users to purchase software and pay for it without ever placing a call or otherwise communicating with the software vendor.

In most cases, including interaction through the Internet, it is generally required that each user have an executable copy of a client software program locally at his or her computer. This may be accomplished by downloading the conventional computer executable code from a server prior to interaction. Additionally, it is possible to download code, such as Java code, through a user's browser application. Once each user has a local copy of the software, there are various methods through which users can "meet" other users and interact.

Users can enter public or private chat rooms where users with similar interests may be located. For example, in the context of a gaming environment, once all specific users are identified, interaction may be commenced via a game server which controls the interaction of play between and among the users. The server communicates with each of the player's local computers through an Internet connection. It is the server's responsibility to, for example, ensure that rules are complied with and that actions and reactions initiated by one player are communicated to other players. In the context of a community chat room, such as, for example, a chat room devoted to sailing, the server may be responsible for enabling users to communicate. News groups may allow a user to view and interact with postings governed by the server. In the context of a photo album application, a server may govern posting and viewing of applicable pictures.

While interaction which is established and implemented in the above described manner is generally acceptable, there are various drawbacks. For example, prior to establishing service, a user must locate the desired application on-line or, alternatively, purchase it in the store. Once the application has been downloaded or purchased, the user must manually complete the often detailed, frustrating and time consuming process of installing the application on the user's local computer. Following this, if the user wishes to initiate network (i.e. Internet) interaction, he or she must establish an Internet connection. Then the user must locate a suitable interaction user. In order to do this, the user is typically required to install a browser, find and "surf" to a web site which allows the user to locate other suitable users and then follow the steps on that site to find those users. These steps may include installing additional software plugins or applets, entering a chat room, and waiting for one or more suitable users to enter the same room. Alternatively, users may locate each other through pre-arranged bulletin boards or through email exchanges. Once the users have been located, various methods exist for establishing a connection between all users through a central or distributed game or communications server. Unfortunately, users with varying interests often have a difficult time locating each other. Additionally, many steps and a significant amount of time are required prior to commencing the actual interaction.

Creating communities of people with similar interests may also suffer drawbacks and difficulties. It may be time consuming and difficult to create a community of interest for users that permits interaction. Communities of interest may be difficult to create, especially for neophyte computer users with little experience in the field. If separate software, applets, or plugins are needed to access the community, it may be difficult to convince prospective community members to find a copy of or go to the website location for downloading the necessary software, download the software, install and configure it, and use the software to communicate with the community. Additionally, it may be difficult to publicize the existence of such a community to others.

Finding such a community may require familiarity with a computer and the Internet. Individual creators of applications or interactive communities may lack the resources to publicize these items.

Further, current interaction on the Internet may suffer from the drawback of technical complexity for users to operate. Communication and interaction may require knowledge of the location of bulletin boards or chat rooms, as well as knowledge to install and use communication applications. The technical complexities and lack of knowledge may create a significant barrier for adoption by new users.

In addition to user interaction, there are various other applications which inherently require communication among multiple individuals and which lend themselves well to establishing and maintaining that communication through the Internet or another flexible communications network. For example, commerce conducted over the Internet (sometimes known as "Electronic Commerce" or "E-commerce"), requires a user to locate an appropriate "on-line store" and then, within that store, locate an appropriate product prior to purchasing it. Searching the entire Internet for a store and then searching within that store can be a daunting task for the neophyte or even an experienced Internet user who has not previously purchased a product through an "on-line store". Further, finding a store that the user trusts may be difficult, as a user often searches the internet on their own, without a referral.

Nor do interactive applications allow administrators to publish or subscribe to information and select customer functionality applications, particularly information located on another application. Current methods of "cutting and posting" information from one area to another often require editing and reformatting the information. These efforts may be time consuming and deter users from publishing such information.

SUMMARY OF THE INVENTION

It is therefore an object of the invention to overcome the drawbacks of the prior art.

It is a further object of the invention to provide a method and system which simplifies processes for interaction among individuals and/or entities which occur through a communications network.

It is a still further object of the invention to provide a system and method for multi-user interaction and communication through a network which is directed to a specific transaction, interaction and/or interest.

It is another object of the invention to provide a system and method which enables creation and distribution of application objects which direct a user to specific information.

It is another object of the invention to provide a system and methodology for invoking an invitation application to simplify the creation of and allow the widespread and rapid distribution ofan electronic connection between a plurality of users through an on-line community associated with a user interest.

These and other objects are achieved through the present invention which provides a system and method for information and application distribution and delivery. The system described herein may be referred to as an Information and Application Distribution System (IADS) and may be preferably embodied as a communication network which may be used for a variety of purposes. In one embodiment, the IADS is employed to distribute, initiate and allow user interaction and communication within communities of users with similar interests. An IADS of the present invention may employ a communication application to distribute and initiate invitation applications having an executable component and a message component. The IADS of the present invention may include access to one or more customized communities which are designed to allow users to interact within a community with various community applications. The delivery methodology of the present invention may circumvent many of the drawbacks encountered in matching or users of applications through prior art techniques.

BRIEF DESCRIPTION OF THE DRAWING

FIGS. 8A1–8A4 and 8B are flowcharts illustrating the process of game distribution via electronic mail and subsequent game play in a preferred embodiment of the present invention.

DETAILED DESCRIPTION OF THE PREFERRED EMBODIMENTS

Figure 1:
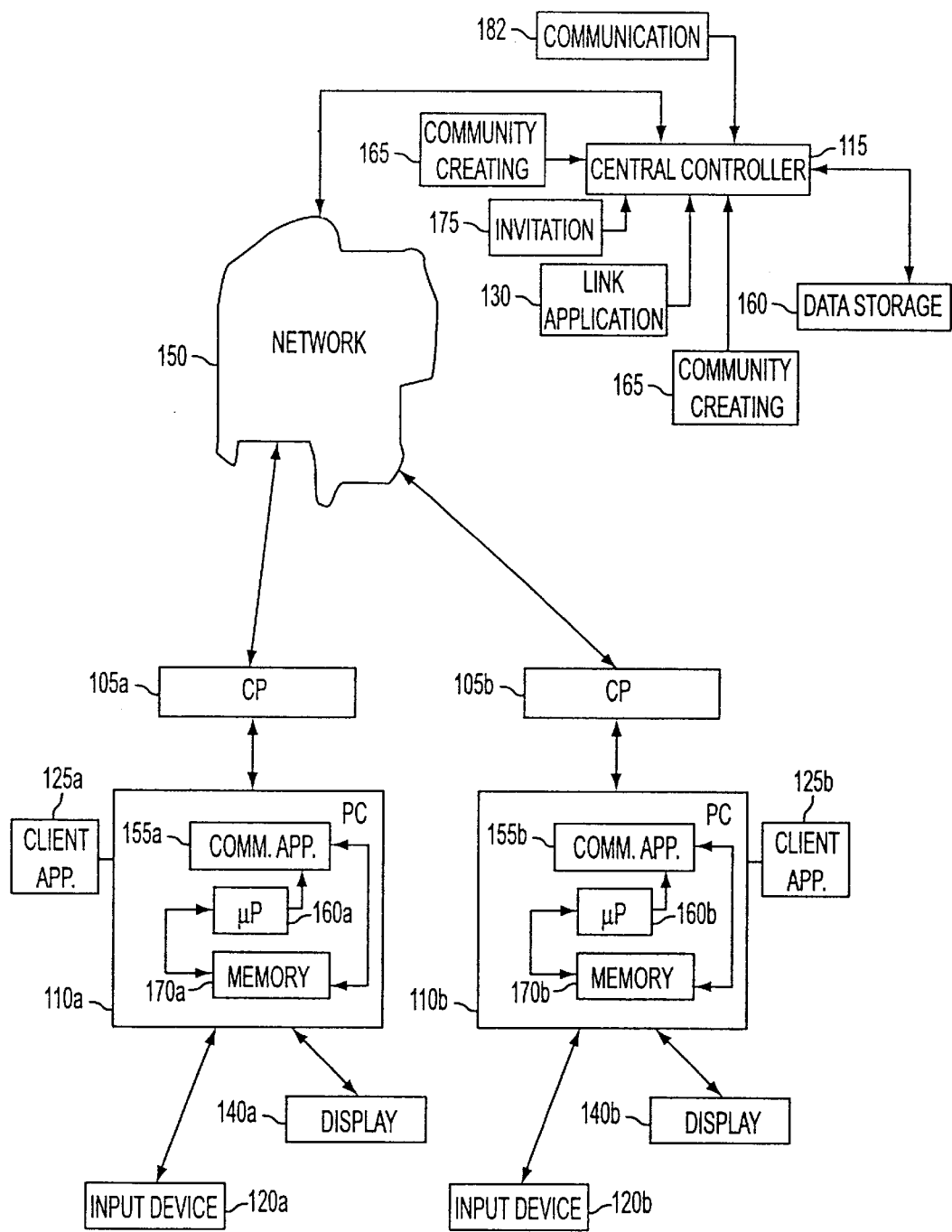
FIG. 1 is a block diagram illustrative of the Information and Application Distribution System (IADS) of the present invention.

The present invention is described in relation to distribution of an invitation application and a client application via a network and an email connection. Nonetheless, the characteristics and parameters pertaining to this distribution are equally applicable to other types of distributions.

For purposes of explaining the present invention, a specific embodiment will be described. This embodiment is examplary only, and is not intended to limit the scope of the invention. A creator accesses a central controller over a network to create a community using a community creating module. In this example, the title of the community is "The William Henry Harrison Historical Preservation Society." The community creating module permits the creator to create a community, and designate applications and content presented in the community by a user interface. The applications in the present example include a chat application object for users to interact with each other in chat format, a schedule application object for scheduling appointments for the events, a pledge application object for pledging a donation, a photo album application object for viewing photos related to William Henry Harrison, and other application objects. Content in the present example includes information about upcoming fund raising events and meetings for the society, information about current funds collected, biographical information about William Henry Harrison, and other information. Different applications may provide different levels of interaction between a user, other users, and the central controller module.

Upon creating the community, the creator designates other users to access the community. The application accesses the creator's locally stored communication address book, such as e-mail address book, or retrieves a centrally stored communication address book from the central controller, and presents the contents to the creator. The creator selects the names and e-mail addresses of the individuals to be invited to access the community. The central controller sends a transmission, such as an e-mail, to the invited users based on the information provided by the creator. The transmission includes a message component and an executable component. The message component describes the community, invites the user to join the community, and provides instructions. In the present example, the message component greets the user, informs the user that the community is named "The William Henry Harrison Historical Preservation Society," describes the community, and invites the user to join.

Upon receipt of the transmission, a user executes the executable component according to the instructions, such as in a known manner, e.g., double clicking on an appropriate icon in a Windows™ environment or other manner of executing the executable component. A login dialog screen is opened for the user. A user provides registration information (e.g. full name, address, personal information, etc.) and forwards the information to the central controller. The login display screen provides the user with a user-id, and prompts the user to supply a password. At this point the program may or may not download additional content objects, application objects, and client software components to allow the user to interface with the Henry Harrison Historical Preservation Society from outside the browser environment.

Using the user interface, the user can interact with the community through the central controller, other users, or both, at appropriate times. Upon entering a community, a user may access content objects, such as subscription objects, application objects, or other content, which form the community. A user automatically receives content objects that are updated. Interaction includes using the various application objects downloaded to the user, such as interacting with another user in the chat area. Where applicable, the central controller module coordinates use of an application object between a plurality of users.

FIG. 1 illustrates an IADS 100 according to an embodiment of the present invention. IADS 100 comprises multiple users 110 connected to Network 150 through multiple Connector Providers (CPs) 105. Network 150 may be any network that permits multiple users to connect and interact. According to an embodiment of the invention, Network 150 may be a dedicated line to connect users, the Internet, an intranet, or other type of network. CP 105 may be a provider that connects a user to a network. According to an embodiment of the invention, CP 105, may be an Internet service provider, a dial-up access or other manner of connecting to a network. In actual practice there may be significantly more users connected to IADS 100 than shown. This would mean that there would be additional users which are connected through the same CPs shown or through other CPs. Nevertheless, for purposes of illustration, the discussion will presume four users 110 connected to Network 150 through two CPs 105.

According to an embodiment of the invention, clients 110 may be users with any computing device capable of accessing Network 150 through CP 105. Alternatively, some or all of users 110 may access Network 150 through a direct connection. FIG. 1 shows two computers 110a and 110b each having a connection to Network 150 through an CP 105a and 105b. Computers 110a and 110b may be personal computers such as those located in a users home, or may be other devices which allow a user to access and interact with others on Network 150. According to an embodiment of the invention, both computers 110 may be connected to Network 150 through the same CP 105. Central controller module 115 may also have a connection to Network 150 as described above. Central controller module 115 may communicate with one or more data storage modules 160, the latter being discussed in more detail below.

According to an embodiment of the invention, each computer 110 may be configured as a typical home based computer. Other configurations may also be used. Each computer 110 may contain a communication application module 155, a processor module 160 and a memory module 170. Communication application modules 155a and 155b need not be the same specific software so long as communication between them is according to standard protocols so that messages sent and received can be recognized. Communication application module 155 may comprise an e-mail application such as Microsoft Beyond Mail™, Netscape Mail™, Eudora Pro™, or the like, and must also comprise an application which can establish a persistent connection to network 150. Computer 110 may have at least one input device 120 for controlling the computer 110. Input device 120 may be a keyboard, joystick, touchpad, scanner or any similar device or combination of devices. Each of computers 110 may also include a display module 140, such as a CRT display or other device. Additionally, clients 110 may contain client application module 125, where client applications comprise content, subscription objects, user interface, application objects, and other content, which will be described in greater detail below.

IADS 100 further includes central controller module 115. Central controller module 115 may maintain a connection to Network 150. Preferably, a connection may be a high speed, large bandwidth connection, such as a T1 or T3 line, although other connections may also be employed. Central controller module 115 may function to permit clients 110 to interact with each other in connection with various applications, messaging services and other services which may be provided through IADS 100.

Central controller module 115 may preferably comprise either a single server computer or multiple server computers configured to appear to clients 110 as a single resource. Central controller module 115 may communicate with a number of data storage modules 160. Particular storage modules 160 are described in further detail below. Various databases may be available in a data storage module 160 as necessary depending upon the specific applications and services made available through IADS 100. In practice, data in a storage modules 160 may be merged into a single database or into groups of databases as determined by a system administrator. According to an embodiment of the invention, data storage modules 160 may be located on one or more data storage devices, where the data storage devices are combined or separate from central controller module 115. Physically, the databases may or may not be co-located on the same storage device.

Communication module 180 may enable central controller module 115 to communicate with others. According to an embodiment of the invention, communication module 180 may comprise an email transfer application such as Sendmail, Postfix, or Q-Mail or the like. Communication module 180 may further enable central controller module 115 to interact with users via user application objects, such as instant messaging. Further, communications module 180 may enable central controller module 115 to interact with an Internet browser, such as Netscape Navigator™, Microsoft Internet Explorer™, or the like.

As will be discussed in more detail below, data storage module 160 may include files associated with various applications which are accessed by users stationed at clients 110. Applications may include computer games, shopping cart applications for the purchase of goods and/or services, work group applications such as word processing, database, accounting, inventory and graphic programs, and other application objects. Many of which will be described in greater detail below. Other applications may also be stored. The data storage module 160 may also include an email database module, which may contain listings of email addresses that are located, indexed and stored as described below. As will be discussed in more detail below, according to an embodiment of the invention, various communities, clients, subscription objects, executable components and other items may be stored in data storage module 160. Data storage module 160 may include an information database module which may contain a variety of different types of information. Central controller module 115 may record various user information in data storage module 160, such as what communities a user is a member is subscribed to, what invitations a user has received, what invitations a user has accepted, and other user information. Central controller module 115 may record community information in data storage module 160, such as community memberships, statistics about community popularity and other community information. Other information may also be stored.

Central controller module may be connected to link application module 130, community creating module 165, and invitation module 175. According to an embodiment of the invention, link application module 130 may assist a user in setting links within a community. The functions of link application module 130 will be described below in greater detail. According to an embodiment of the invention, community creating module 165 may assist a user in creating a community. The functions of community creating module 165 will be described below in greater detail. According to an embodiment of the invention, invitation module 175 may assist a user in inviting other users to join a community. The functions of invitation module 175 will be described below in greater detail.

Creating a Community

Figure 2:
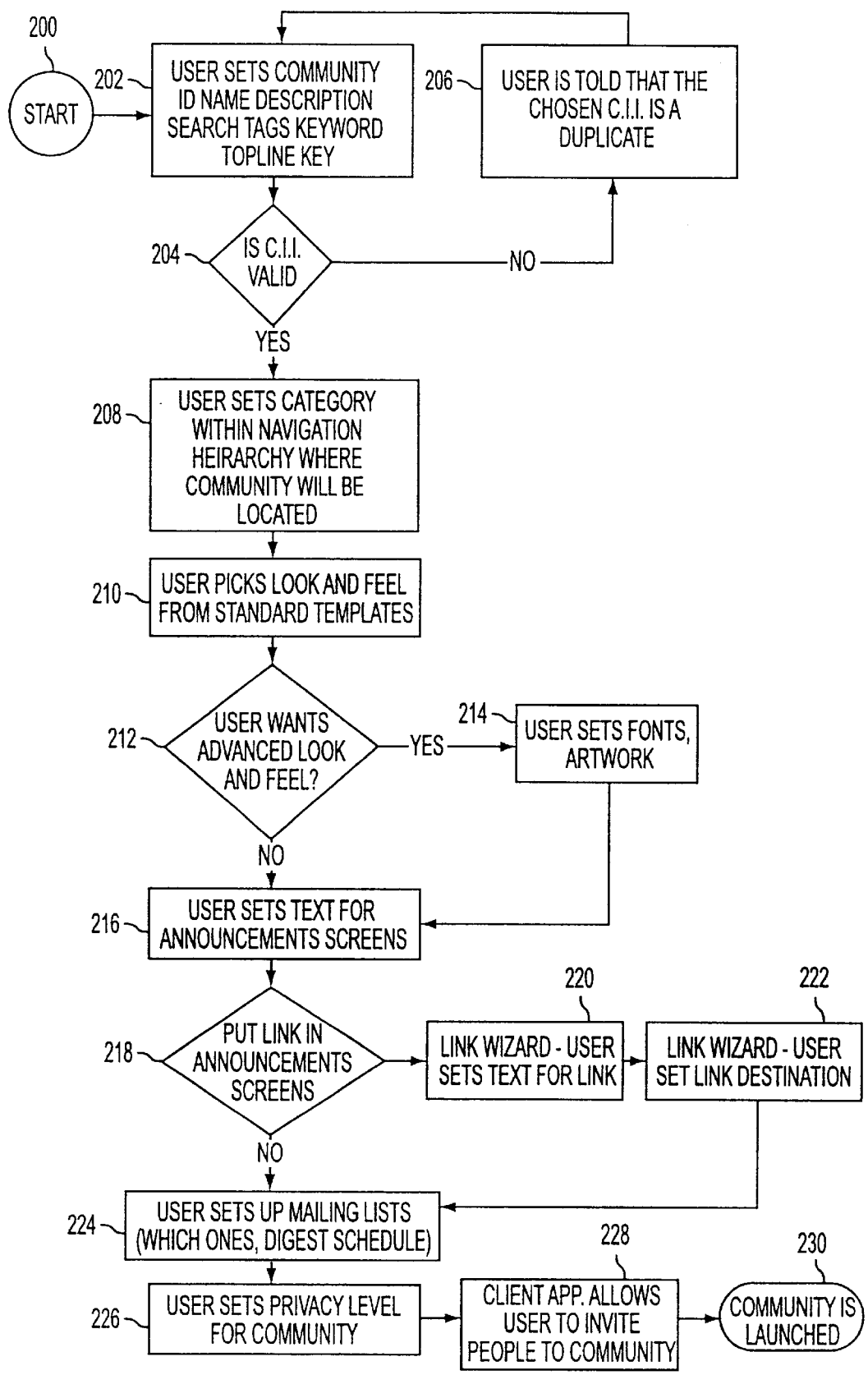
FIG. 2 is a flowchart illustrating steps in creating a community according to an embodiment of the invention.

FIG. 2 is a flow-chart which illustrates creating a community according to an embodiment of the invention. A creating user, or creator, starts creating a community at step 200. At step 202, a creator provides community identification information, and community identification information is screened to determine if the information is valid at step 204. If community identification information is not valid, a creator is informed at step 206, and is returned to step 202. If community identification information is valid, a creator sets a category at step 208. At step 210, a creator determines the look and feel of a community, and decides whether to advanced look and feel at step 212. If yes, a creator sets artwork and fonts at step 214, and sets text for the announcements screen at step 216. If a creator decides not to select advanced look and feel, the creator sets text for an announcements screen at step 216. At step 218, a creator determines whether to have a link in an announcements screen . If yes, a creator uses a link application module to set text for an announcements screen at step 220, and may set a link destination at step 222. Upon setting a link destination, or if a creator elects not to set a link, a creator sets up a mailing list at step 224. At step 226, a user sets a privacy level for community. A user invites others to a community at step 228, and launches a community at step 230. The method of FIG. 2 will now be described in more detail.

A creator accesses community creating module 165 through central controller module 115 at step 200. According to an embodiment of the invention, community creating module 165 may provide the framework through which central controller module 115 interacts with a user to create a community, and related applications and functions. According to another embodiment of the invention, community creation may comprise a web-based creation. Other configurations may also be used.

At step 202, a creator provides community identification information to a central controller module 115. Community identification information may comprise a community name, description, search tags, keywords, and topline key. By way of example, a creator may name a community and provide a brief description, such as naming the community the "Omaha Sailing Club" and may describe the community as a group of sailors in the greater Omaha, Nebr. area who have an interest in sailing and following sailing events. A creator may further designate appropriate keyword(s), metatag(s), search tag(s), and /or other classifications for a community, such as "Omahasailing" as a keyword, and "Omaha," "sailing," "Nebraska," "boats," "yachts," and "water" as search tags. Community identification information may further comprise information about the creator, such as name, address, personal information, and other creator information. Community identification information may also comprise computer information, such as an electronic identifier (e.g., cookie, computer identification number. etc.) and other information about the computer. Other community identification information may also be requested.

According to an embodiment of the invention, a creator may input the requested information through input device 120. Information may be automatically provided to central controller module 115 through the connection of user 110 with central controller module 115, such as the computer identifier number. Other methods for providing information to central controller module 115 may also be used, such as inputting information into a telephone keypad or personal digital assistant.

At step 204, central controller screens community identification information to determine if it is valid. If community identification information is already in use, such as a community name already in use, a creator may be informed of this event at step 206, and may be returned to step 202 to provide different community identification information. According to an embodiment of the invention, a creator may be required to acknowledge the use of the community identification information by another, such as by requiring the creator to click on a dialog box to continue to step 202.

If community information is valid, a creator may designate a community category at step 208. The category may be within a hierarchy of categories, where the creator is presented with various categories and subcategories with which to associate the community. By way of example, a hierarchy may contain various categories, such as "Arts & Humanities," "Education," "Government," "Recreation & Sports," or "Science," and subcategories. For the category "Recreation & Sports," for example, various subcategories may include "College Football," "Professional Basketball," and "World Cup Soccer." Under the category of "Education," for example, various subcategories may include "Engineering," "High School," and "Elementary Education." Subcategories may be further divided into other subcategories. Other categories and subcategories may be used to identify a community. According to an embodiment of the invention, a creator may categorize a community under more than one category or subcategory. By way of example, a community entitled "Omaha Sailing Club" may be categorized under a "Recreation & Sports" category. Other methods of categorization may also be used.

Additionally at step 208, a creator may designate community fields. Community fields may comprise a category or categories of interest, language, location, age group, and meta-tags of interest associated with the community, and may overlap with other community identification information. According to an embodiment of the invention, community fields may designate English as the language of the community, sailing as the category of interest, and Omaha, Nebr. as the location for the community. Community fields will be described in more detail below.

At step 210, a configuration editor is presented to a creator. A configuration editor may allow a user to build a community, designate content and application objects, subscribe to subscription objects, and add other information associated with the community.

According to an embodiment of the invention, information, applications, functions and other aspects of a community may be generally considered content objects, where content objects may comprise portions of a community which a user may access. Content objects may further comprise application objects, subscription objects, or other content of a community. Other types of content objects may also be used. Application objects and subscription objects will be described in greater detail below.

According to an embodiment of the invention, a configuration editor may present various standard community templates and application objects (or "functions") to build a community, and various options or customizations for a creator to create a community. According to an embodiment of the invention, standard templates may comprise templates for arranging functions and content. Standard application objects may comprise a chat application object, a shopping cart application object, an instant message application object, a navigation application object, a search application object, an address application object, a news group application object, or other application objects. Standard application objects may be available to all users. A chat application object may comprise a scrolling chat window, where users may interact by typing messages to each other. According to another embodiment of the invention, limited standard application objects may be available to certain user. Limited standard application objects may comprise a creation application object, an exit application object, an invitation application object, or other application objects. An exit application may allow a user to exit a community. An invitation application object may allow a user to invite others, such as in the manner set forth in FIG. 3.

According to an embodiment of the invention, a community may have an electronic store associated with the community. A creator may "stock" the electronic store with items of interest to users of the community, such as subscribing to vendor subscription objects. A shopping cart application object may permit a user to select items from the electronic store to purchase either immediately or at a later time. Other application objects may also be used.

Options may include modifying standard applications, designating optional applications, creating unique applications, creating specific content, organizing the presentation of a community user interface, designating who can access the community, and designating who is initially sent the community, including the message component and executable component. Other options may also be present by a configuration editor. According to an embodiment of the invention, community creating module 165 may enable a creator to create a desired unique application. According to an embodiment of the invention, a unique application created by a creator may be saved on community creating module 165 and may.be later presented to another creator as an optional application. A unique application may be altered before being presented as an optional application or may be presented as created. According to another embodiment of the invention, application objects may be created independently by a user, or by a third party. Other methods for creating a unique application may also be used. Various functions will be described in greater detail below.

According to an embodiment of the invention, a creator may subscribe to available subscription objects. Subscription objects may be various objects, such as chat content, a product to purchase, a photograph file, or other item, which has been published by another user. Publishing a subscription object enables others to subscribe to the subscription object. The subscription object may be accessed through a community and an application object. By way of example, a transcript of a chat session in a community related to politics may be published by an administrator of a community. A creator (or administrator) of a second community related to politics may subscribe to the subscription object corresponding to the chat session, thereby enabling the users of second community to access the contents of the chat session. Other manners for subscribing may also be used.

At step 212, a creator determines whether to modify a community to achieve an advanced look and feel. If a creator desires an advanced look and feel, a creator may be presented with various options to modify a community look and feel at step 214. Options may include modifying various fonts, sizes and colors of various content (e.g., title, text, headers, etc.), modifying backgrounds, such as different colors or designs, designating attributes of tabs and buttons, and other selections which determine the "look and feel" of the community. According to an embodiment of the invention, a creator may be presented with pull down menus to select various options. A creator may also import options, such as artwork, pictures, video, audio, or other files to modify a community. By way of example, a creator of a community entitled "Omaha Sailing Club" may be presented with two pull down menus providing options for the title. A creator may select "Book Antiqua" as the font, and 14 point as the size. Further, a creator may upload a picture of a sail boat to serve as a background for the community and may upload an audio file of sea gulls and waves to be heard when a user first accesses the community. Other modifications may also be made.

Once a creator has set the advanced "look and feel" or if a creator elects not to set the advanced "look and feel," a creator may set text for an announcements screen at step 216. According to an embodiment of the invention, a community may have an announcements screen which provides an introduction to the community, and may be accessed by a user selecting the announcements tab. A creator may select what text will be displayed on the announcements screen, as well as the text content on the announcements screen associated with an announcements tab. Text may include greetings, community news, announcements, or other information associated with the community. According to an embodiment of the invention, an announcements screen may be the first display a user views when entering a community. By way of example, the creator of the community entitled "Omaha Sailing Club" may designate that text on the announcements screen introduce a user to the community and provide a brief explanation about various functions and content of the community. Other manners of setting text on an announcements screen may also be used.

At step 218, a creator determines whether to place a link to another community in an announcements screen. If a creator elects to place one or more links in the announcements screen, a creator may be presented with link application module 130, and may set text for a link or links at step 220. Setting text for a link may comprise a creator entering text to describe the link. At step 222, the creator may set the link destination. By way of example, another community may be entitled "America's Cup™ Watch" and may focus on various milestones and events leading up to and occurring in the America's Cup™ sailing races. A creator may provide a link in the announcements screen to this community, and set text for the link, such as "America's Cup™ Schedule of Events." A user may then activate the link and be taken to the "America's Cup™ Watch" community. Other manners of providing links may also be used. For example, a community administrator may wish to originate a link to another community in another screen, such as the screen displaying the chat application object, instead of originating the link in the announcements screen. A community administratory may wish to place links directly to a subscription object within another community. A community administrator may determine that another community has a particularly active chat room that may be of interest. The administrator may create a link directly to that chat room, rather than the entrance of the community. Finally, an administrator may also wish to create links originating from or pointing towards World Wide Web pages, or may incorporate some or all of a World Wide Web page directly into the community application.

Once a creator has set links in the announcements screen, or elected not to set links, a creator may set up one or more mailing lists at step 224. According to an embodiment of the invention, a community may have one or more groups associated with the community. Groups may comprise officers, people within a certain geographic location, or other types of groups. Mailing lists may enable a user to send a message to certain users in a community. By way of example, the creator of the "Omaha Sailing Club" community may create a mailing list for club officers, a mailing list for members of different marinas, a mailing list for users with an interest in catamarans, and a mailing list for users with an interest in single hull sail boats. Other types of mailing lists may also be used.

At step 226, a creator designates the privacy level of a community. According to an embodiment of the invention, a privacy level may indicate what users may access the community. Various privacy levels may determine what users may access a community. Some privacy levels may require a specific invitation, such as from a designated user (e.g., administrator) or a member of the community. Other privacy levels may allow users to apply without an invitation, where a specified user approves the membership. Another level of privacy may allow any user to join. According to an embodiment of the invention, privacy levels may determine whether a community is listed within a hierarchy of communities, and whether the content of the communities are published. Communities with high privacy levels may not be listed within a hierarchy or a user interface, while communities with lower privacy levels may be listed. By way of example, the creator of the "Omaha Sailing Club" community may select a privacy level that allows any user to enter the community without an invitation, but requires a community administrator to approve the membership within the community. Other manners of determining privacy for a community may also be used.

When designating privacy levels, a creator may designate specific users to perform certain functions within a community. A creator may delegate functions to other users (or "administrators") and/or may empower other users to perform functions. Such functions may include inviting individuals, stocking a community store, approving an individual to join a community, punishing users for inappropriate conduct in a community, monitoring functions to ensure compliance with community standards, publishing or subscribing to subscription objects, or other functions related to a community.

According to an example, a community titled "The XYZ Softball Team" may be created, where information about the XYZ Softball team, including a schedule of games, player statistics, and other information, is presented. A creator may determine that only members of the XYZ softball team should be able to access the community. A creator may provide to central controller module 115 a list of team members, along with appropriate information. Central controller module 115 may compare information provided by a user to the information provided by a creator, thereby governing access to the community.

According to an embodiment of the invention, a creator may designate certain users to allow others to access the community. According to the example of a community titled "The XYZ Softball Team," there may be a coach and two assistant coaches for the team. The coach of the team may create the community and a designate that each team member may be able to access the community. Further, the creator may designate that the two assistant coaches may allow other users to access the community. According to an embodiment of the invention, users designated to allow other, non-designated users to access a community may receive a client application with a "tag" encoded within. The tag may indicate the chain of communications, e.g., how the client application was sent from one user to another. According to an embodiment of the invention, a user may not join a community unless that user received the client application from a user designated to allow other users to access the community. Thus, according to the example of the "The XYZ Softball Team" community, assistant managers may receive a client application with a tag. Any user who receives an invitation directly from one of the assistant managers may access the community. If the client application is not received directly from one of the assistant managers, a user may be prohibited from accessing the community. According to another embodiment of the invention, central controller module 115 may maintain records regarding what users may invite other users into a community. Members of the "XYZ Softball Team" community other than the coach or assistant managers would not be able to invite other users to become community members. Other methodologies for designating who can access a community may also be used.

According to an embodiment of the invention, a creator may determine whether users can interact within a community in total anonymity, in various stages of anonymity, or without any anonymity. A user may provide certain information to allow for identification. A user may enter a user name for a community, and may create a profile, where the profile comprises information about the user that may be accessed by other users. Users may elect not to provide certain information in a profile. By way of example, a creator may indicate that all members of a community must disclose the user's actual name and address in a profile. Other manners of determining user privacy may also be used.

At step 228, a creator may invite people to join a community. According to an embodiment of the invention, a creator may generate an invitation message to other users, inviting them to join the community. A creator may further provide a communications address, such as an e-mail address, to allow an invitation and a executable application to launch the community to be sent to one or more users. According to an embodiment of the invention, the community client application operating on the creator's computer may access the creator's locally stored communications address book (e.g., e-mail address book), or the central controller module 115 may access the creator's centrally stored address book. A list of communications addresses may be presented to the creator, thereby enabling the creator to select users to invite without being required to input each communications address for each user. Other manners of inviting users may also be used. At step 230, a creator may launch a community. Other manners of creating communities may also be used.

Inviting Other Users

Figure 3:
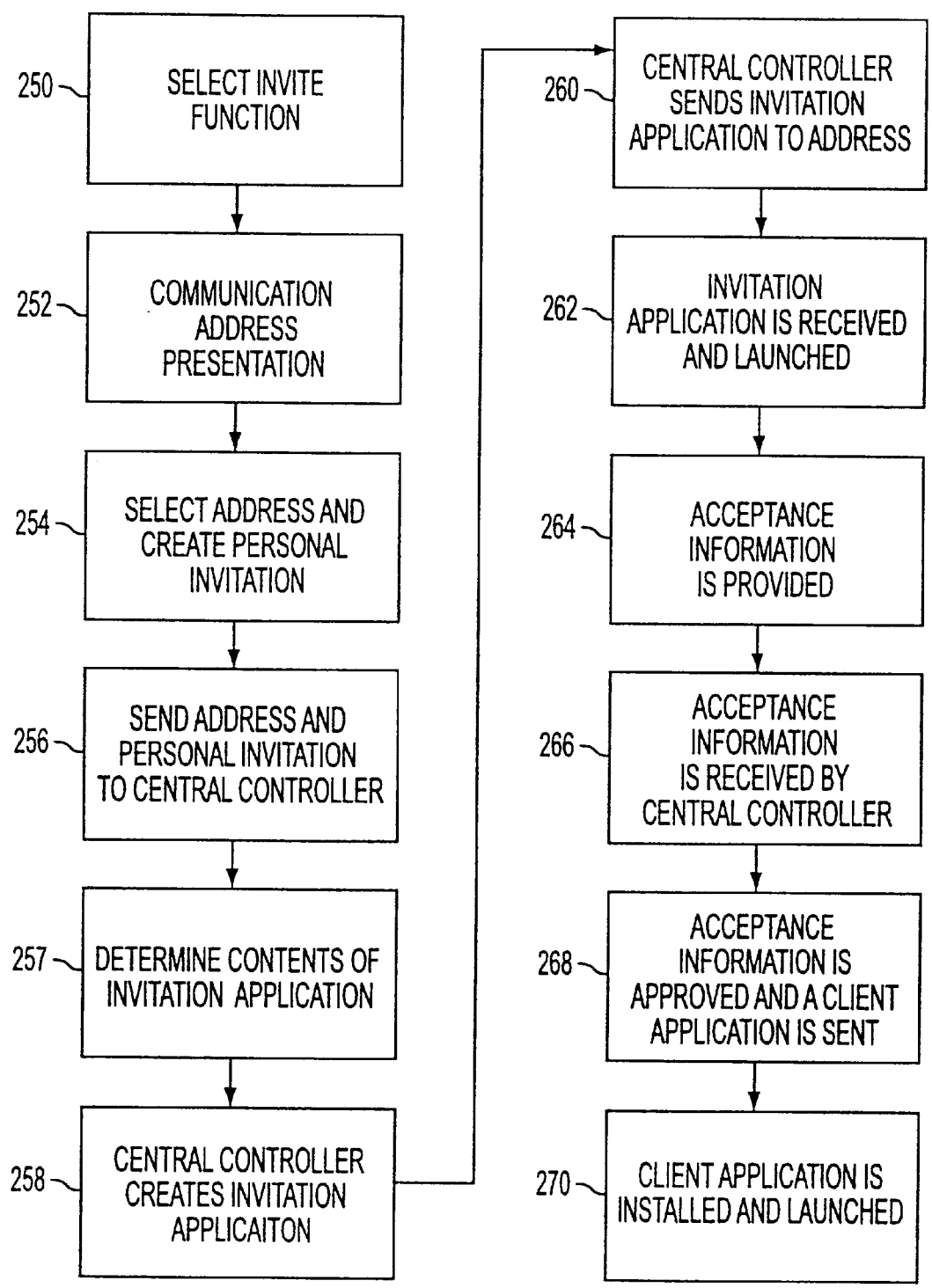
FIG. 3 is a flowchart illustrating steps in distributing and initiating a community according to an embodiment of the invention.

FIG. 3 is a flow-chart which illustrates inviting other users to participate in and/or join a community according to an embodiment of the invention. At step 250, a user activates an invite function. At step 252, a user's communication address book is accessed and a list of communication addresses is presented. A user selects communication addresses and creates a personal invitation at step 254, and sends communication addresses and personal invitations to central controller module 115 at step 256. At step 257, the contents and configuration of an invitation application are determined, and at step 258, central controller module 115 creates an invitation application. At step 260, central controller module 115 sends an invitation application to the communication addresses. An invited user receives the invitation application and launches it at step 262. The executable component prompts an invited user to provide acceptance information at step 264. At step 266, the acceptance information is sent to central controller module 115. Central controller module 115 approves the acceptance and transmits a community client application at step 268, and launches the community client application at step 270. The method of FIG. 3 will now be described in more detail.

Figure 4:
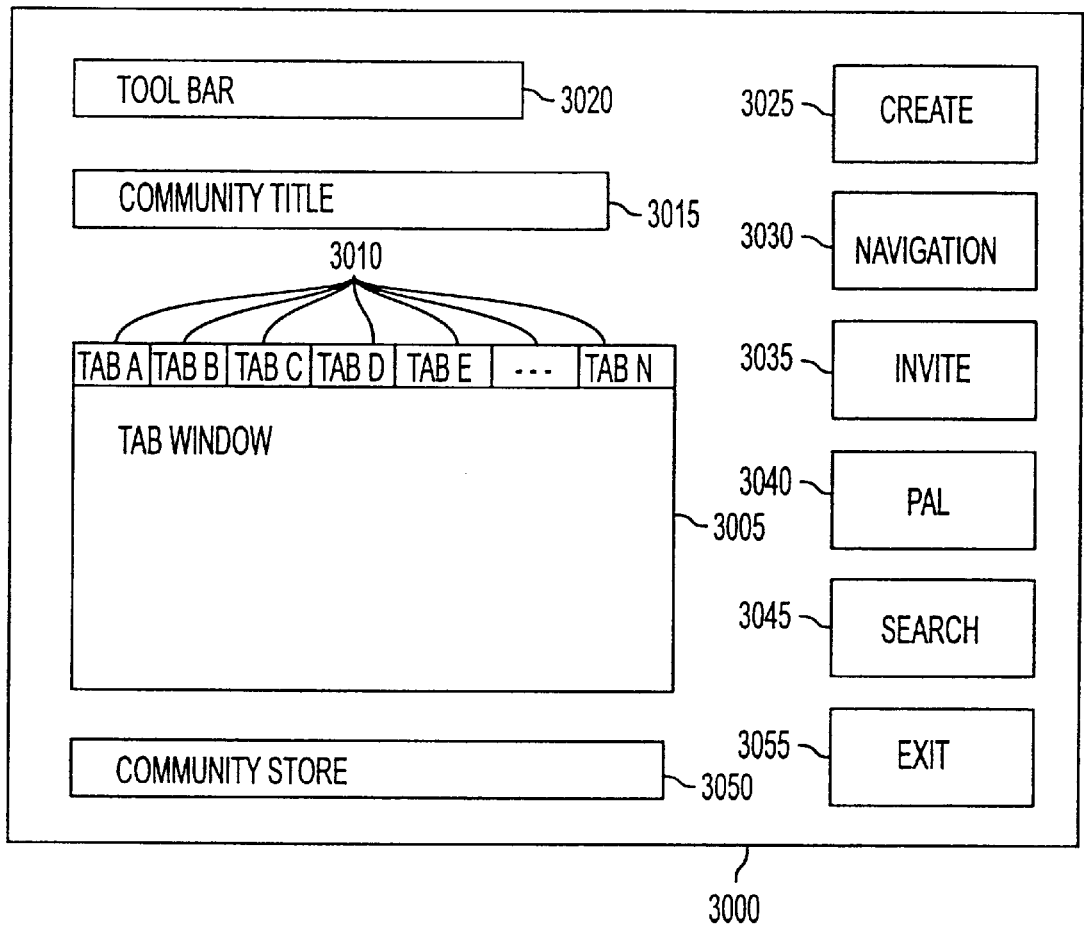
FIG. 4 is a graphic user interface for a community according to an embodiment of the invention.

A user may access invitation application module 175 through central controller module 115 at step 250. According to an embodiment of the invention, invitation application module 175 may provide the framework through which central controller module 115 interacts with a user to invite other users to join and/or interact with a community, and related applications and functions. According to an embodiment of the invention, as described in FIG. 4, a user may access invitation application module 175 by activating invite function button 3035 located on graphic user interface 300. An example of an embodiment of graphic user interface 300 is described in greater detail below. Other configurations may also be used.

At step 252, a user's communication address book (e.g., e-mail address book, IRC chat address book, etc.) is accessed, such as through a client application using client 110. A client application may present a list of communication addresses to user, by retrieving communications addresses located within a user's communication address book. A user may select communication addresses from the list presented, thereby enabling the user to select other users to invite without being required to input a communications address for each user.

According to an embodiment of the invention, a user may desire to invite an individual who is not in a user's communication address book. A client application may present a user with the option to manually input a communication address such as, for example only, presenting a dialog box for a user to enter an e-mail address. Other manners of selecting communication addresses may also be used.

A user may generate a personal invitation as communication addresses are selected. According to an embodiment of the invention, a user may generate a different personal message for each communication address. An individualized personal message may address the invited user by name, such as referencing an invited user by name, describing aspects of the community of specific interest to an invited user, and other personalized comments. According to an embodiment of the invention, a user may generate one general personalized message to be sent to all selected communication addresses, where the one general personalized message is sent to all invited users, but is created by the user inviting the others. Such a general message may describe various aspects of a community, including general portions of interest to the invited users. Other manners of generating personal invitations may also be used.

At step 256, a user sends one or more selected communication addresses and personal invitations to central controller module 115 through communication address module 135. Communication addresses and personal invitations may be sent to central controller through any known manner. By way of example only, communication addresses and personal invitation may be thorough a communications application, such as an e-mail transmission, an "instant message" transmission, or other manner of transmission. Other manners of sending may also be used.

At step 257 central controller module 115 may determine what an invited user needs to join a community. Central controller module 115 may determine what an invited user needs based if the invited user has previously registered with another community. Central controller module 115 may check records, such as records located on data storage modules 160.

At step 258, central controller module 115 creates an invitation application. According to an embodiment of the invention, message component may comprise a personal invitation and an instruction invitation. Central controller module 115 may create an instruction invitation to combine with a personal invitation provided by a user. An instruction invitation may provide instructions to an invited user regarding how to execute an executable component, how to interact within a community, what behavior is acceptable within the community, where to find help to interact with the community, and other instructions that may be of use to an invited user. Central controller module 115 may combine a personal invitation, such as a personal invitation provided by a user, with an instruction invitation to form a message component. Other manners of generating a message component may also be used.

According to an embodiment of the invention, if an invited user has not registered previously, central controller module 115 may combine an executable component with a message component. An executable component may be resident on central controller module 115, such as, for example, a self-extractable zip archive. An executable component may provide assistance in registering a user to join a community and for downloading appropriate information needed to access a community. Executable components will be described in more detail below. An executable component may be combined directly with a message component, or may be modified for an invited user before being combined with a message component. According to an embodiment of the invention, central controller module 115 may generate a new executable component to combine with each message component, such as if a unique message component is being sent. An executable component may be personalized for an invited user, such as personalized based on the community to be invited to, personal preferences, , or other characteristics. Other manners for using executable components and creating an invitation application may also be used.

Further, an executable component may contain all applications necessary to view and interact in a community.

These applications will be described in greater detail below. An executable component may assist an invited user in accepting and registering for a community and obtaining the proper information and/or files to access and interact with a community. When an executable component is launched, it may read a user's identification number, such as from the name of the zip archive, and may connect to the server to begin setup and download of a client application for a community. A user ID may be used to retrieve a user's communication address off of central controller module 115, as well as retrieve other user-specific information, such as which community a user has been invited into.

According to an embodiment of the invention, an invited user may already be registered with another community and have previously received an executable component. Central controller module 115 may generate a message component, as set forth above, for the new community to which the invited users is to be invited. Central controller module 115 may also generate an acceptance component to combine with a message component to form an invitation application. An acceptance component may prompt an invited user to accept an invitation and provide further information. By way of example only, an acceptance component may prompt a user to accept an invitation, provide a user identification for the community and provide a password for the community. Other manners of providing acceptance components may also be used.

At step 260, central controller module 115 sends an invitation application to an invited user. According to an embodiment of the invention, an invitation application comprises a personal invitation, an instruction invitation, and an executable component. According to another embodiment of the invention, an invitation application comprises a message component and an acceptance component. An invitation application may be sent to an invited user via a transmission using an appropriate communication address, such as an e-mail address. Other manners of transmitting an invitation application may also be used.

At step 262, an invited user receives an invitation application and launches an executable component of the invitation application. According to an embodiment of the invention, an invited user may receive an invitation application and may access a message component of the invitation application. A user may launch an executable component according to known launching methods (e.g., double clicking on an executable icon, etc.). According to an embodiment of the invention, an invited user may launch an acceptance component of the invitation application. Other manners for receiving and launching an executable component may also be used.

At step 264, executable component prompts a user to provide acceptance information. An executable component may present a user with a login dialog on-screen. According to an embodiment of the invention, a dialog design may be simple with a minimum of fields to avoid confusing an invited user. A user may be given the option to change user name and default email (for example, the address that the executable component was sent). A user may be prompted to provide other user information, as well as enter a password and confirm it. According to an embodiment of the invention, an acceptance component may prompt a user to provide appropriate acceptance information. According to an embodiment of the invention, a user may press a button to cancel an install if the user is not inclined to download a client application for a community. Central controller module 115 may record invited users who declined an invitation to a community, such as recording in data storage module 160. Records may include the name and e-mail address of an invited user and who initiated the invitation.

According to an embodiment of the invention, a user may designate user fields while registering. User fields may comprise a user's selection of language, a category or categories of interest, age group, location, and other items to designate interests of the user. According to an embodiment of the invention, user fields may correspond to community fields. Community fields will be discussed in greater detail below. Other information may also be recorded.

An executable component forwards registration information to central controller module 115 at step 266. According to an embodiment of the invention, registration information may be sent via a communication application, such as e-mail. According to an embodiment of the invention, an acceptance component forwards acceptance information to central controller module 115. Other manners for transmitting registration information may also be used.

At step 268, central controller module 115 approves acceptance and transmits a client application to the invited user. According to an embodiment of the invention, acceptance may comprise recording that an invited user accepted an invitation to join a community. An executable component may assist central controller module 115 in downloading a client application upon confirmation that installation should proceed. According to an embodiment of the invention, a client application may be downloaded while an invited user watches a tutorial. When the download is complete, a user may have a link that has been associated on the user's computer. At step 270, a user may launch a community, such as activating a link to launch a client application for a community. The link may designate information necessary for the invited client to connect to central controller module 115 and initiate the user into the community. Other manners of launching applications may also be used, for example the community may launch automatically after the central controller module completes the download. A user may enter a community and access content objects, such as subscription objects, application objects, and other content, which form the community. Further, upon entering the community, a user may automatically receive updated content objects as appropriate.

When a client application is launched to access a community, a user may be presented with a login screen. The user may access a community by entering the correct password a community. Once the password is verified, a graphic user interface 3000, as illustrated in FIG. 3, is displayed. Graphic user interface 3000 may contain a tab window 3005 with tab interface 3010. Tab interface 3010 may comprise a plurality of tabs, such as announcements, chat, and communications. A user may select a tab from tab interface 3010 to access a particular function. A community title 3015 may be displayed on graphic user interface 3000.

Tool Bar 3020 may allow a user to browse through the hierarchical structure that organizes various communities. Graphic user interface 3000 may display the current location within a hierarchy, as well as the subcategories below the current location in the hierarchy. Graphic user interface 3000 may also display links to content and communities that are available at other categories and subcategories. Links may enable a user to jump to another community, category, or subcategory.

Community Functions

Graphic user interface 3000 may present a user with community related functions including community information, chat, instant messaging, discussion groups, classifieds, and mailing lists. The chat function allows users to interactively participate in a text based discussion involving other members of the community. Instant messaging allows a user to send a text message directly to a selected user. Discussion groups allow community members to post and respond to messages related to topics of interest to the community. Classifieds allow members of the community to post advertisements for products and services they wish to purchase or sell, and that are of interest to the community. Mailing lists provide a convenient mechanism by which community members may send email that reaches other members of the community.

Another set of functions are related to finding, creating and building communities. A Create Function 3025 may allow a user to create a new community, as set forth above in FIG. 2. An Invite Function 3035 may allow a user to invite others to join a community. A Navigation Function 3030 may allow a user to browse through a hierarchical representation of communities and content to find communities they may wish to join or community content they want to view. A Pal Function 3040 may allow a user to maintain a "Pals" list of people whom they wish to have available for communication at all times. A Search Function 3045 may enable a user to search for communities, vendors, products or users. An Exit Function 3055 may enable a user to exit a community. A Community Store 3050 Function may enable a user to purchase items. Various functions will now be described in greater detail below.

Pals

According to an embodiment of the invention, a user may Select Pal Function 3040, which may comprise a scrollable window containing a list of users who have been selected as the user's pals. A user who invites another user into a community may be added to the list by default. Other users can be added to the pals list by highlighting a user within a chat room users list and adding to a pals list button.

Invite

A user may select Invite Function 3035. Invite Function 3035 may allow a user to invite people from an address book and pals list into a community. As illustrated above in FIG. 3, the client application reads a communication address book and pals list and puts the names and addresses into a list. A user selects various addresses, and may enter a personalized message to her friends.

Navigation

Once the user has experienced a community, a user may desire to see other communities. A user may select Navigation Function 3030, which may offer top-line categories such as sports and leisure, business and commerce, arts and entertainment, and so on. Browsing within a category may reveal lower level sub-categories. According to an embodiment of the invention, communities may be listed within categories, and icons next to the names of communities will provide an indication of the relative sizes and activity levels of a community, as well as an indication of how a user may join the community. Some communities will be open for all users to join. Other communities may be open on various levels of exclusivity, as established when a community is created, and therefore may not appear on a navigation menu.

A user may use Navigation Function 3030 to go to a desired community. Appropriate content objects for a given community may be downloaded and launched, putting the user in the community. A user may be faced with the same interface as when the original community was launched.

Announcements

A user may select an announcements screen, which may be a basic welcome mechanism to a community, where messages relevant to the community at large may be posted. An announcements tab may have links embedded into displayed messages, where links point to other communities.

Create

A user may select a create tab that enables creation of a community. A user may select Create Function 3025, such as that set forth in FIG. 2 above, may allow a user to create and design a community, select application objects and subscription objects available in a community and designate other features of a community.

Chat

A user may select a chat tab from tab interface 3010 of graphic user interface 3000. According to an embodiment of the invention, a user may be presented with a list of users who are currently in the room, along with the text window for the chat itself and a text-entry space. Attached to the text-entry space may be a send chat button. In addition, buttons for various functions may show user information, send a message to someone in the room, ignore a person (block receipt of their entries in the chatroom), add a person to the user's pals list, invite another user to a different community in the user's membership list, and invite users in the room into a private chat session. Other manners of chat may also be used.

Instant Message

A user may also select an instant message tab from tab interface 3010, where a user may send a message that is immediately transmitted to just the selected recipient. According to an embodiment of the invention, a window is displayed containing a dropdown list containing the name of the selected recipient (such as from a chat room user list or a Pals list), and an area for the user to enter in the text of the message. The user can overtype the name of the recipient to send the message to, or can drop down the list to select from a list of recipients to whom they have recently sent instant messages. A find button may also be provided that allows a user to search for recipients.

According to an embodiment of the invention, if the recipient is not currently online, the instant message will be displayed to them the next time they enter into a community. If a recipient is online, an instant message will immediately be displayed to them.

Mailing Lists

Mailing lists may allow a user or administrator to send email to a group of people in a community. An email sent to a list may be distributed to all currently subscribed members of the list. According to an embodiment of the invention, an administrator list, an announce list, a support list, and a discussion list may be provided. An administrator list may be used by administrators within a community to send messages to other administrators for the community. An announce list may be used by administrators to send messages to the members of a community. A support list may be used by community members to send messages to the community administrators. A discussion list may be used by community members to send messages to other members of the community. Other lists may also be provided. According to an embodiment of the invention, a user may subscribe and/or unsubscribe to a given list.

Classifieds

A user may select a Classified Ads tab from tab interface 3010 of graphic user interface 3000, where classified ads may be a resource for members of a community to post and answer ads for goods, services, and interests relating to the community or in general. According to an embodiment of the invention, ads may be available according to different levels. At a global level, all communities may have access to an ad, or a user may elect to have the visibility of an ad limited to the current community. When an ad is created, the visibility level may be set by default, such as to the level of the community from which it was created, for only a particular community, or for all communities. A user may override and specify the privacy level when an ad is created. A user may respond to an ad, such as by sending a message via email to the user posting the ad. A user may also search for ads using a search entry field and search button associated with classified ads.

Subscription Objects

Subscription objects, as set forth above, may be various objects, such as chat content, a product to purchase, a photograph file, or other item, which has been published by another user. Publishing a subscription object enables others to subscribe to the subscription object. The subscription object may be accessed through a community and an application object. A subscription object may be published (e.g., made available for others to access in a community) and subscribed to (e.g., selected to be accessed in a community). A user, upon entering a community, may access subscription objects, as well as applications objects and other content objects, which form the community. A use may automatically receive updated content objects as appropriate.

Figure 5:
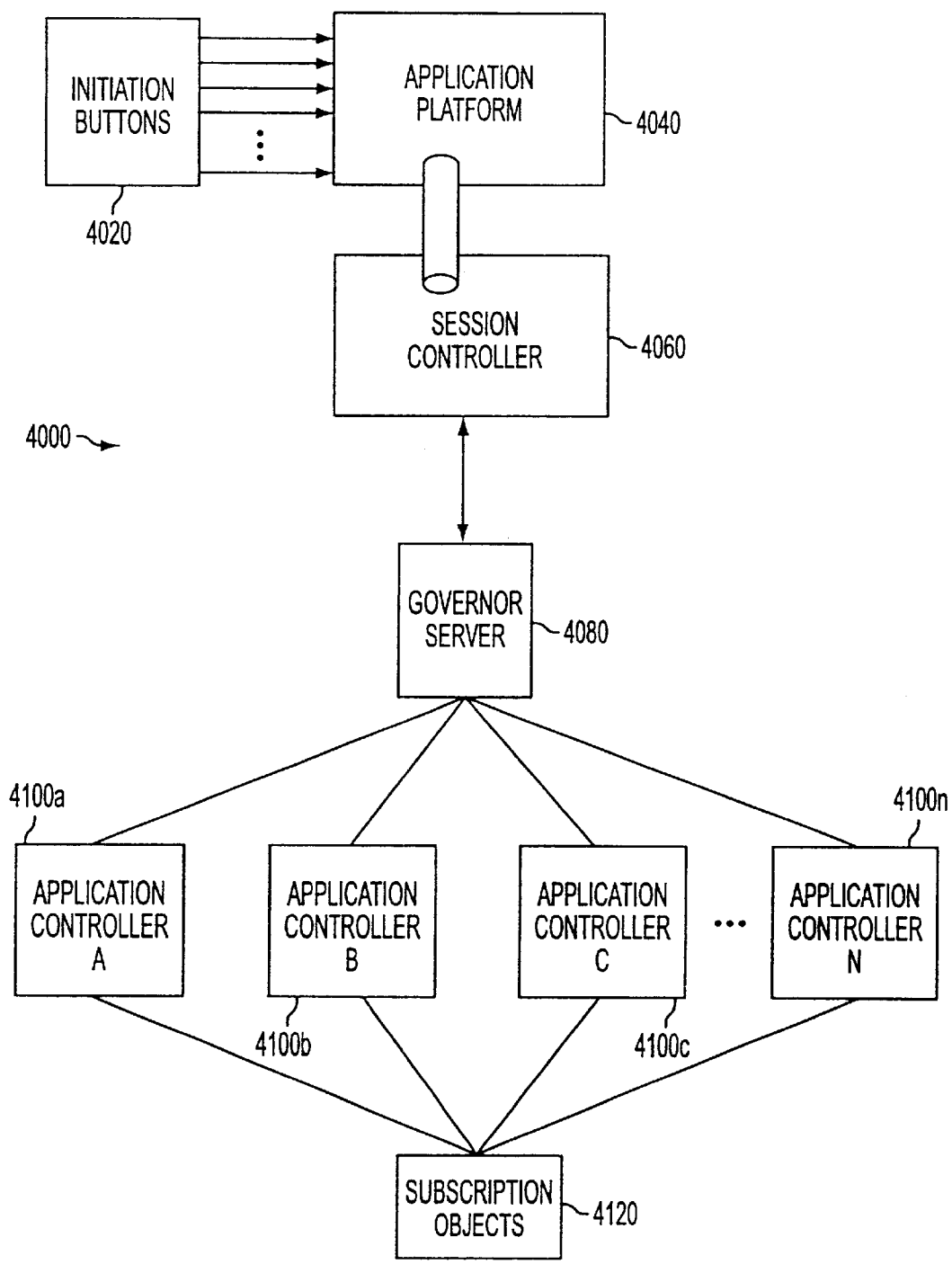
FIG. 5 is a schematic illustration of accessing subscription objects according to an embodiment of the invention.

FIG. 5 is a schematic diagram illustrating a system 4000 for controlling access to various subscription objects. System 4000 may comprise application objects 4020 associated with application platform module 4040, where a user may initiate, such as through graphic user interface 3000, one or more application objects 4020. A user may initiate an application object 4020, such a chat application object, an instant message application object, a whiteboard application object, a shopping cart application object, an invitation application object, a creation application object, a photo album application object or any other application object. According to an embodiment of the invention, initiation buttons 4020 may be displayed on graphic interface 3000.

Application platform module 4040 organizers initiation buttons 4020. According to an embodiment of the invention, application platform module 4040 may be located on a user's computer, such as client 110, and may organize the presentation of application objects presented through initiation buttons 4020. Application platform module 4040 may further coordinate initiation and execution of various application objects. By way of example, an application platform 4040 located on client 110, may coordinate a user initiating a photo album application object and a whiteboard application object, such as by coordinating areas (e.g. "windows") within a community for a user to interact with the application object.

Application platform 4040 may be in communication with session controller module 4060. According to an embodiment of the invention, session controller module 4060 may coordinate initiation and execution of various application objects by controlling the running of the application objects. In coordinating initiation and execution of application objects, session controller module 4060, in communication with application platform 4040, may enable a seamless operation to be presented to a user, such that the user does not know one or more application objects are acting in concert. Session controller 4060 may allocate memory to various application objects, determine processing requirements, regulate information to download for an application object, or other manner of coordinating the initiation and execution of an application object. Session controller 4060 may be located on the server side or on the client side of a network. Other manners of coordinating may also be used.

Session controller 4060 may communicate through a network (e.g Network 150) with governor server module 4080. Governor server module 4080 may further communicate with application controller modules 4100. According to an embodiment of the invention, governor server module 4080 may be located on one server, while each of application controller module A 4100*a*, application controller module B 4100*b*, application controller module C 4100*c*, through application controller module N 4100*n* may be located on separate servers. By way of example only, application controller module A 4100*a* may correspond to a chat application object and be located on one server, while application controller module B 4100*b* may correspond to an instant message application object and be located on another server. According to another embodiment of the invention, governor server module 4080 and application controller modules 4100*a*–4100*n*, may be located on one server, or a combination of servers.

Governor server 4080 communicates with application object modules 4100 to access various application objects. Session controller 4060 may communicate to governor server module 4080 that a particular application object (e.g. a chat application object) is to be accessed. Governor server module 4080 may access the appropriate application object module (e.g. application controller module A 4100*a*). According to an embodiment of the invention, Governor server module 4080 may coordinate access, transmission and execution of one or more application objects by session controller 4060. Other manners for accessing applications objects may also be used.

Application controller modules 4100 may be in communication with subscription objects module 4120. According to an embodiment of the invention, a community may subscribe to one or more subscription objects, which may be accessed through an appropriate application controller module 4100. A user may create a subscription object for use in a community. The user may "publish" the subscription objecting by permitting users of one or more communities to access the subscription object. According to an embodiment of the invention, an administrator may "drag and drop" a subscription object into an appropriate file to enable other communities to access the subscription. "Drag and drop" may comprise highlighting and dragging a subscription object in a conventional manner (e.g., clicking and moving with a mouse) to a publishing area within a community. When the subscription object is dropped into the publishing area, an administrator may be prompted to provide information about the subscription object, as well as designate permission levels to subscribe to the subscription object. Information may include a brief description of the contents, categories that subscription object is related to, who created the subscription object and other information related to the subscription object. Permission levels may include designating what communities have permission to subscribe to a subscription object. An administrator publishing a subscription object may designate that only communities devoted to related subject matter may subscribe to a subscription object, that a subscriber must pay to access a subscription object, or other designations that limit subscribing to a subscription object. Other manners of providing information about subscription objects may also be used.

By way of one example, a producer or seller of a product, such as a book about sailing, may publish an subscription object for the book, where the subscription object is located in subscription object module 4120. Using an appropriate application object, such as a shopping cart application object, a user may interact with the subscription object, such as by reviewing and buying the book. In publishing a subscription object, a creator of the subscription object may designate what users or communities are eligible to interact with the subscription object. By way of this example, the creator of the subscription object may designate that the subscription be available to communities related to books (e.g. books, clubs, book reviews, publishers, etc.) and to boating (e.g. sailing, history of boats, builders, etc.). The creator of a community or a community administrator may then elect to subscribe to a published subscription object. According to this example, an administrator of the "Omaha Sailing Club" community may subscribe to the subscription object for the sailing book.

By using initiation buttons 4020, a user may view the subscription object. As stated above, session controller module 4060, in communication with application platform 4040, may enable a seamless display of subscription objects. A user may be unaware, due to this seamless display, that one or more application objects are working in connection with the subscription object. For example, the subscription object, located in subscription object module 4120, may be accessed by a shopping cart application object located in the appropriate application object module 4100, Governor server module 4080 facilitates session controller module 4060 in accessing the shopping cart application. Session controller module 4060 coordinates initiation and execution of the shopping cart object, while application platform module 4040 coordinates presentation of the shopping cart application object and interaction with a user. Other manners of accessing subscription objects may also be used.

By way of another example, a community may be related to heart disease, and the users may comprise doctors within a hospital. A particular bulletin board session in the community may discuss various aspects of certain characteristics of heart disease, and may further discuss a newly released study on these characteristics. A community administrator may determine that the contents of the bulletin board session may be of interest to other doctors. Using a "drag and drop" feature, the administrator can publish the bulletin board session contents as a subscription object. The community prompts the administrator to provide information about the subscription object. The administrator may provide a brief description of the contents of the bulletin board session, including the study that was discussed. The administrator may also provide information about the number and identity of participants in the bulletin board session. Further, the administrator may determine that only communities related to heart disease may subscribe, and that other communities must pay a fee to subscribe to this particular subscription object. Other manners of publishing a subscription object may also be used.

Field Matching

A user may select Search Function 3045 to search for communities, users, vendors, and/or products. As described above, a creator may designate one or more community fields, and a user may designate a user field. According to an embodiment of the invention, a vendor may designate a vendor field. A vendor may have a product to sell to one or more users and/or communities. A vendor may describe the product by providing information for vendor fields. Vendor fields may comprise a category or categories of interest, language, location, age group, and meta-tags of interest associated with the product. According to an embodiment of the invention, vendor fields, community fields, and user fields may have corresponding information. Central controller module 115 may have a field matching function associated therein to match users, communities, and vendors based on the fields provided. A user may provide information in a user field. According to an embodiment of the invention, a user may designate user fields when creating a profile. User fields may also be designated by signing on to a mailing list. Field matching may occur periodically, (e.g., hourly, daily, weekly, etc.) and the results may be presented to a user. According to an embodiment of the invention, field matching results may be presented when a user enters a community, such as when a user enters (e.g., logs into) a community. Field matching results may be presented to the user. By way of example, a user may enter the "Omaha Sailing Club" community and be presented with vendor fields and community fields. The vendor field may describe a book, in english, about sailing races around the world. The community field may describe anther newly created sailing community, where the membership is in Lincoln Nebr. According to another embodiment of the invention, a community may have a field matching area, where a user may access the field matching function to learn about other products and/or communities. A user may provide information for a user field, and may activate the field matching function. Other manners of field matching may also be used.

Figure 6:
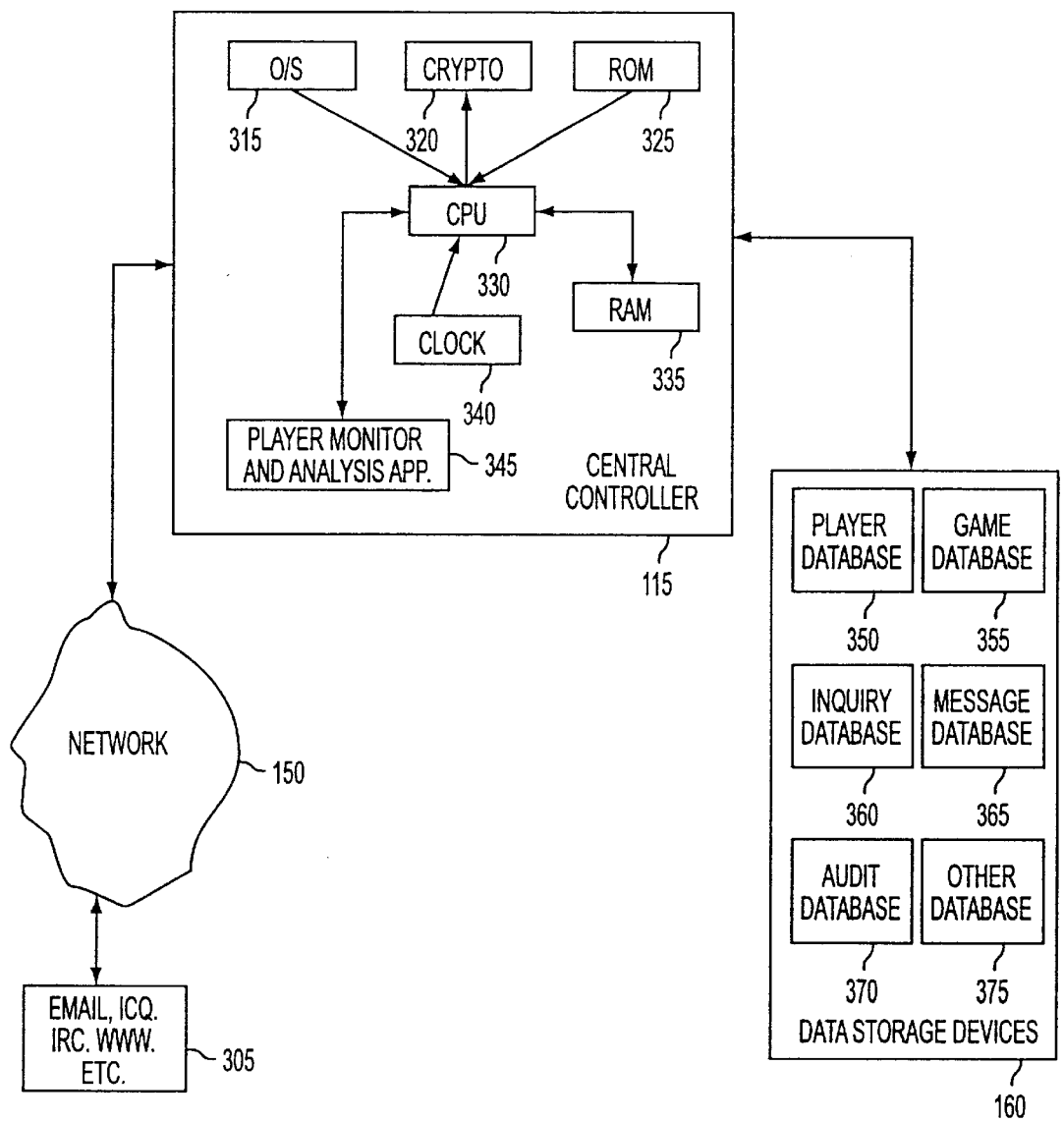
FIG. 6 is a block diagram of an IADS according to a specific embodiment of the invention.

According to an example of the present invention, a community may be created for enabling users to interact in a gaming environment. The following example provides a specific embodiment for such a community using the present invention. FIG. 6 illustrates components of central controller module 115 and data storage module 160 in detail. It is understood that components outlined in FIG. 1 may also be used in this system as appropriate. Each of these components and its function is now described.

The central controller module 115 may function as a game server for a gaming community and controls the start of a game, the game play and rules enforcement, monitors game progress, and player scoring, and determines the end of the game. Central controller module 115, following game play may also award game points to players (e.g. users) at the conclusion of the game. Additionally, central controller module 115 may act as the interface for game play among multiple players and may also obtain various types of information from players and purchasers of games, game elements (such as game cards used in connection with game play) and associated game and products. Central controller module 115 also provides certain information to players and purchasers. Information provided may include, for example, new games, advertisements, promotions, updates, and/or new user information for use in contacting the user. Information received and provided is stored in data storage module 160.

The central processing unit module 330 may provide overall control over the operations occurring on central controller module 115. The cryptographic application module 320 supports the authentication of communications between a service provider (which may, for example, operate a multi-player game service and own or lease central controller module 115), players and/or purchasers and advertisers/vendors. In this preferred specific embodiment, two cryptographic applications are included: one for playing, monitoring, and distributing communities and games and another for e-commerce functions such as paying for purchases, ordering products, etc. The community and game encryption application may be industry standard encryption (e.g., SSL, RSA, SET, etc.), and is used to distribute communities, games, monitor games, and trade virtual values. The operating system (OS) 315, read only memory module 325, random access memory module 335, clock module 340, and player monitor and user analysis application modules 345, provide support to CPU module 330.

In a preferred embodiment, OS 315 is either Unix based or Microsoft Windows NT™. Further, read only memory module 325 may include a commercial BIOS for low level system control. Player monitor and user analysis application modules 345 may provide control over community interaction, game play and administration. For example, these applications may serve to ensure only legal moves and actions (according to game rules) are made. Player monitor and user analysis application modules 345 may also serve to control game scoring and award distribution, as well as ascertain members of a community. While the above embodiment describes a single computer acting as central controller module 115, those skilled in the art will realize that the functions can be used on a distributed set of networked computers.

Prior to a discussion of the various databases which may comprise data storage device modules 160, a background regarding game play in general is provided. While the present invention may be employed with various applications in general and various computer games particularly, IADS 100 may be particularly well suited for computer games involving multiplayer play and which involve particular "game elements" as a part of game play. For example, a game may involve the use of "game cards." Game cards are icons, a game playing capability, that represent elements of a game, e.g., by allowing players certain abilities in the game. A free set of game cards may initially be sent to a player, such as with an invitation to a community. Additional cards can be purchased through Internet 100 using IADS 100. All cards are initially sent to the player with the free set "unlocked." In effect, this is controlled by maintaining a database (e.g. game database module 355) which enables particular cards or other game elements on a player by player basis. Cards can be traded between players via central controller module 115, either through a community, or independently. All elements of the game are present in the executable included in the application object, but the players do not have permission to use some elements (e.g. cards) in the game until they have been "purchased."

Returning to data storage module 160 and the description of its possible components, data storage modules 160 store, update and provide information stored in various databases including, for example, player database modules 350, game database module 355, inquiry database module 360, message database module 365, audit database module 370 and other database modules 375. Data storage modules 160 may include one or more hard disk drives including magnetic and optical storage units, as well as CD-ROM devices or flash memory. Those skilled in the art will recognize that the storage of the database contents could alternatively be distributed over Network 150, such as the Internet, or over another network. Player database module 350 may store information pertaining to what games and game cards (or other elements of game play) the player owns and can use, and selected player demographics. Inquiry database module 360, contains a historical data set including information relevant to player and/or purchaser requests as well as various other types of information such as advertising preferences, purchasing history, the number and value of virtual value tickets (discussed below), and rating and ranking of players. The audit database module 370 may contain information relevant to the purchases made by the player such as payment history and status as well as fulfillment history and status. Game database module 355 contains historical information concerning the particular games played such as when the games were played, game results, levels of play, etc. as well as associated player information. Message database module 365 contains a summary of information, by player, concerning types of messages sent to the player and received by the player and/or purchases and any results of game play. The other database modules 375 may contain any other type of information associated with the application including, for example, summary information, usage of virtual awards, advertiser information, usage statistics and the like.

Figure 7:
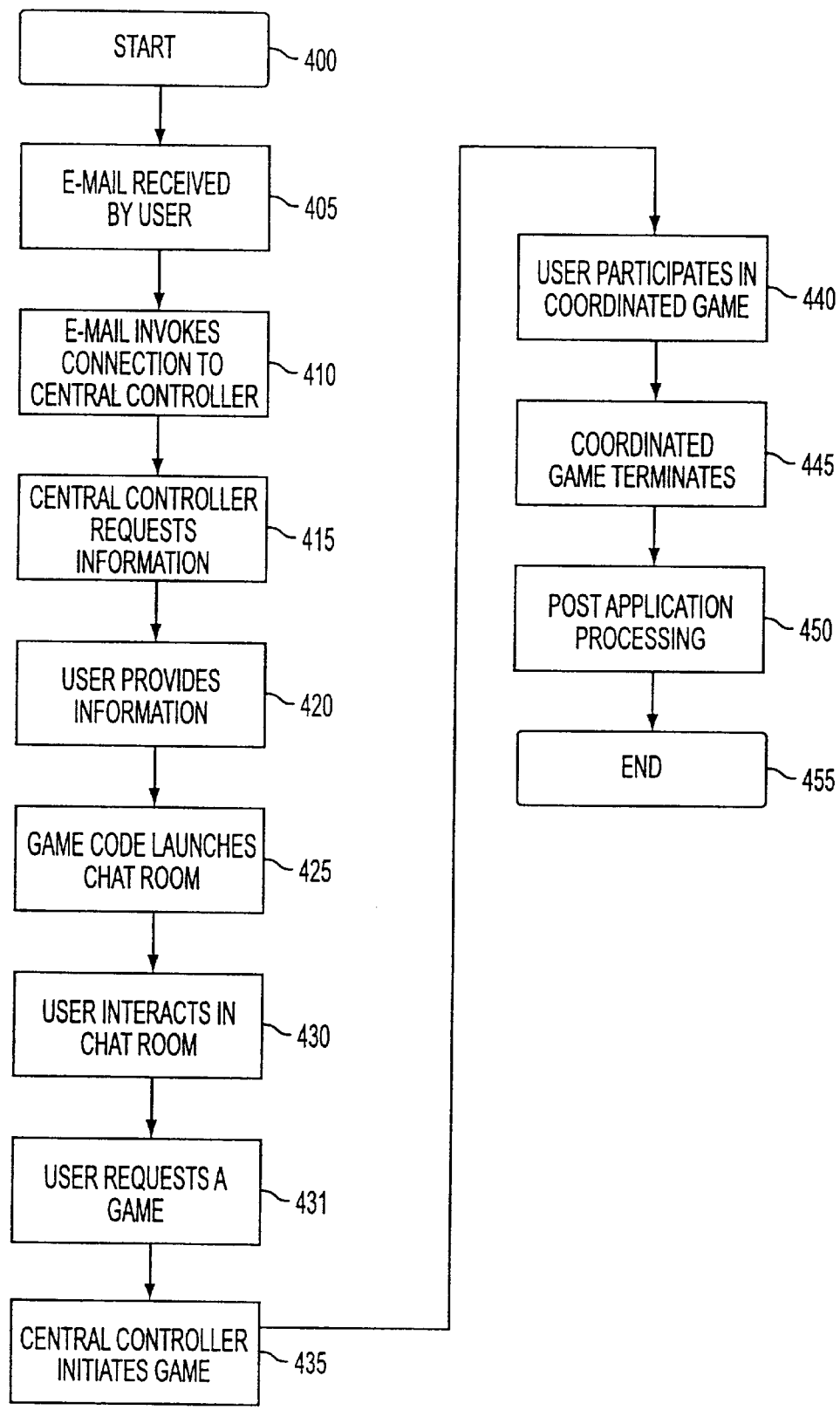
FIG. 7 is a flowchart illustrating the major steps in distributing, initiating and controlling a multiple player computer game application in a particular embodiment of the present invention.

In order to provide multiple player game play through the Network 150 under the control of central controller module 115, a number of steps take place after a community information and subscription objects are received. Those skilled in the art will recognize that control could alternatively be accomplished through a peer-to-peer network or through other communications links. The steps associated with the game distribution and play are illustrated by the flowchart included as FIG. 7. Each of the steps in FIG. 7 is described generally at this point with further detail following below. First, at step 400, the process is initiated. In step 405, the user in question is sent an email containing a message component and an executable component in the form described below. According to an embodiment of the invention, an e-mail may include an executable component with one or more application object file locations. Upon receipt of this email, the user may open it to view its contents. The email preferably indicates (through the message component) that the purpose of the email is to allow the recipient to join a community and participate in multiple player game play using IADS 100. If the user decides to participate in a game play community, the user must "activate" the executable component received. This may be accomplished by "opening" the attachment or "launching" the attachment under a specified application. Upon invocation of the executable component, connection to central controller module 115 may be established (step 410). The connection may be established through a connection provider (e.g. an internet service provider) using any one of many available protocols through Network 150. According to an embodiment of the invention, the application object is preferably composed in Simple Message Transfer Protocol (SMTP) format or another format that permits conversion for email systems that do not recognize SMTP. Conversion routines may be included within the application object for use by the target email applications.

Upon a user's decision to enter a community to play a game, a client application, which may have a small distribution and play application will be initiated. The distribution and play application may be in the form of an automatically self loading program for loading a client application. This component invokes a connection to central controller module 115 through Network 150. The user clicks on the application represented, for example, by a link to a community or by the executable file (.exe) for the application. The user registers, providing registration and user information. According to an embodiment of the invention, a client application with a distribution and play application may be downloaded from central controller module 115 to a local hard drive through the connection established by executable component. The user may enter a chat room provided by the client application and which updates itself from server automatically. According to another embodiment of the invention, a user may be presented a dialog box by the client application. From there, the user can launch a game in a community by initiating an application object, e.g. a JAVA application object, a chat application object, etc. By way of an example in a gaming environment, the distribution and play application may be written in the C++language so that JAVA applications can be easily launched. Loading a client application with a distribution and play application will be described in more detail below.

At step 415, after the connection has been established, central controller module 115 may request particular information from the user prior to initiating any further activity. The information request may include a request for personal information or other information which may be useful in marketing the application. Additionally, central controller module 115 may automatically capture particular information relevant to the user without action by or even the knowledge of the user. For example, central controller module 115 may capture information relevant to the source of the invitation application code (i.e. the initial source of the email and the routing involved in eventual transmission to this user.).

The user responds to the information requests at step 420. According to an embodiment of the invention, a client application with a distribution and play application may be downloaded while a user responds to requests for information. Depending upon the responses and predetermined results based upon the responses, the user may or may not be permitted to proceed (e.g., or join a community). In the event that the user is denied the right to proceed central controller module 115 may transmit a predetermined message describing the reason(s) for denial. Alternatively, if the user is permitted to proceed based upon his or her responses, the user may be placed in a chat room at step 425. Preferably, the first chat room is a "lobby" permitting the user to access various areas within a community, such as to move from room to room until he or she locates players desiring to play the same game as user. According to another embodiment of the invention, a user may be placed in an announcements screen of a community. The chat room is preferably invoked through an application object obtained from the executable component emailed to the user at Computer 110 and executed locally at Computer 110. The chat room application object preferably resides at central controller module 115 so as to permit other users who also have a local copy of the chat application object to communicate between and among each other. For example, in this way, it is possible for a user at Computer 110*a* to communicate via a chat room with a user at Computer 110*b*.

For example at step 430, users located at computer 210*a* and computer 210*b* may interact with each other in the chat room in a community and perhaps determine that they both would like to play the computer game which is included in the invitation application object which has been previously emailed to both users or which may have been e-mailed from one user to the other outside of the chat room. By selecting, for example, a button within the chat room, each of the users, under the control of central controller module 115 are set up to play the computer game against each other. This occurs at step 435. According to another embodiment of the invention, a button to set up game play may be located outside the chat room, but within the community. Once the execution procedures have been completed, the users may participate in coordinated game play at step 440 under the control of central controller module 115. It is also possible that other users may also have been located in the chat room and selected for inclusion in the multiple player game. Once play is completed at step 445, post application processing activities may proceed at step 450. Post application processing may include, for example, awarding of prizes or tickets and/or gathering of additional information. These activities are discussed in greater detail below.

Figures 1, 8A:
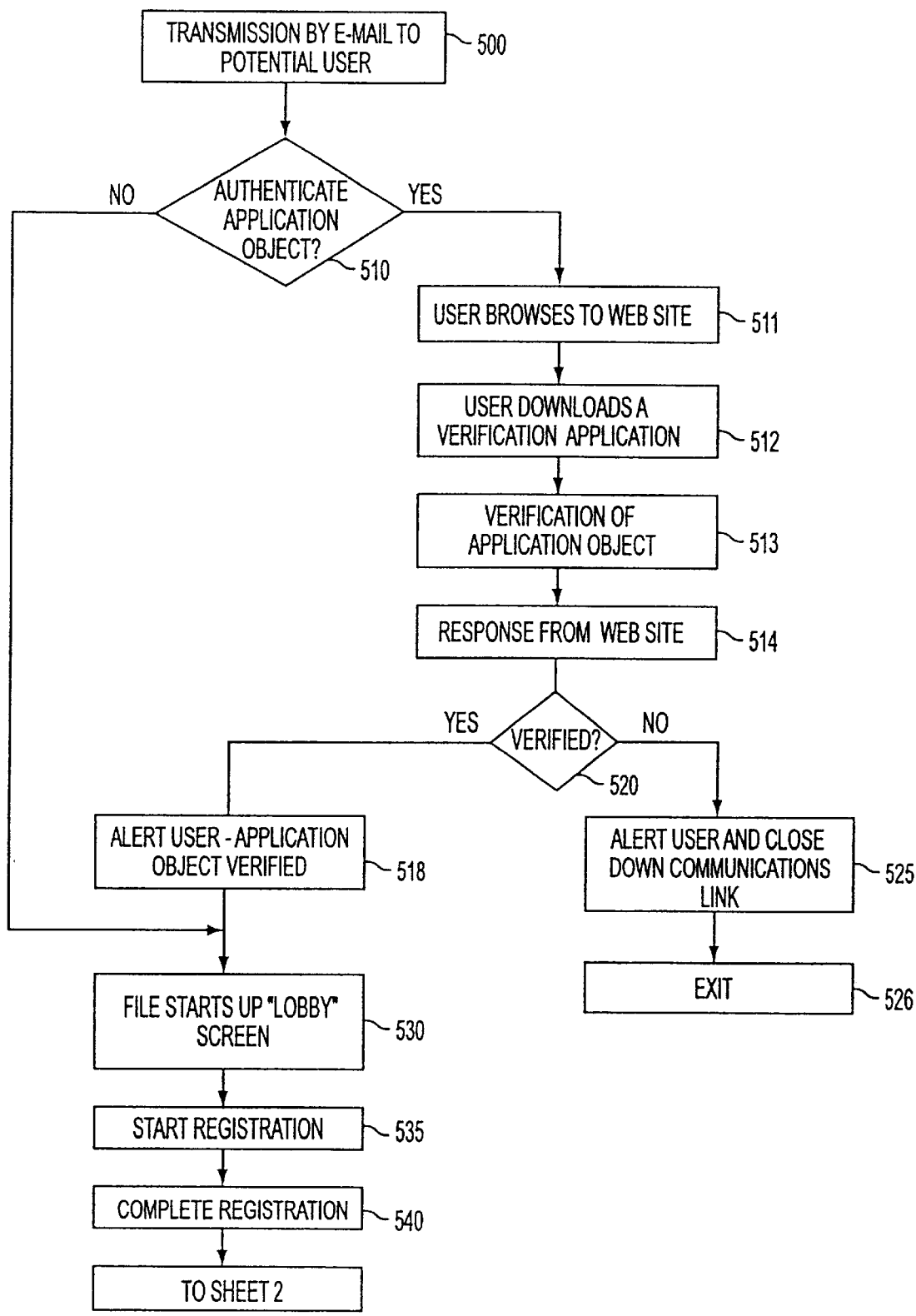
Figures 2, 8A:
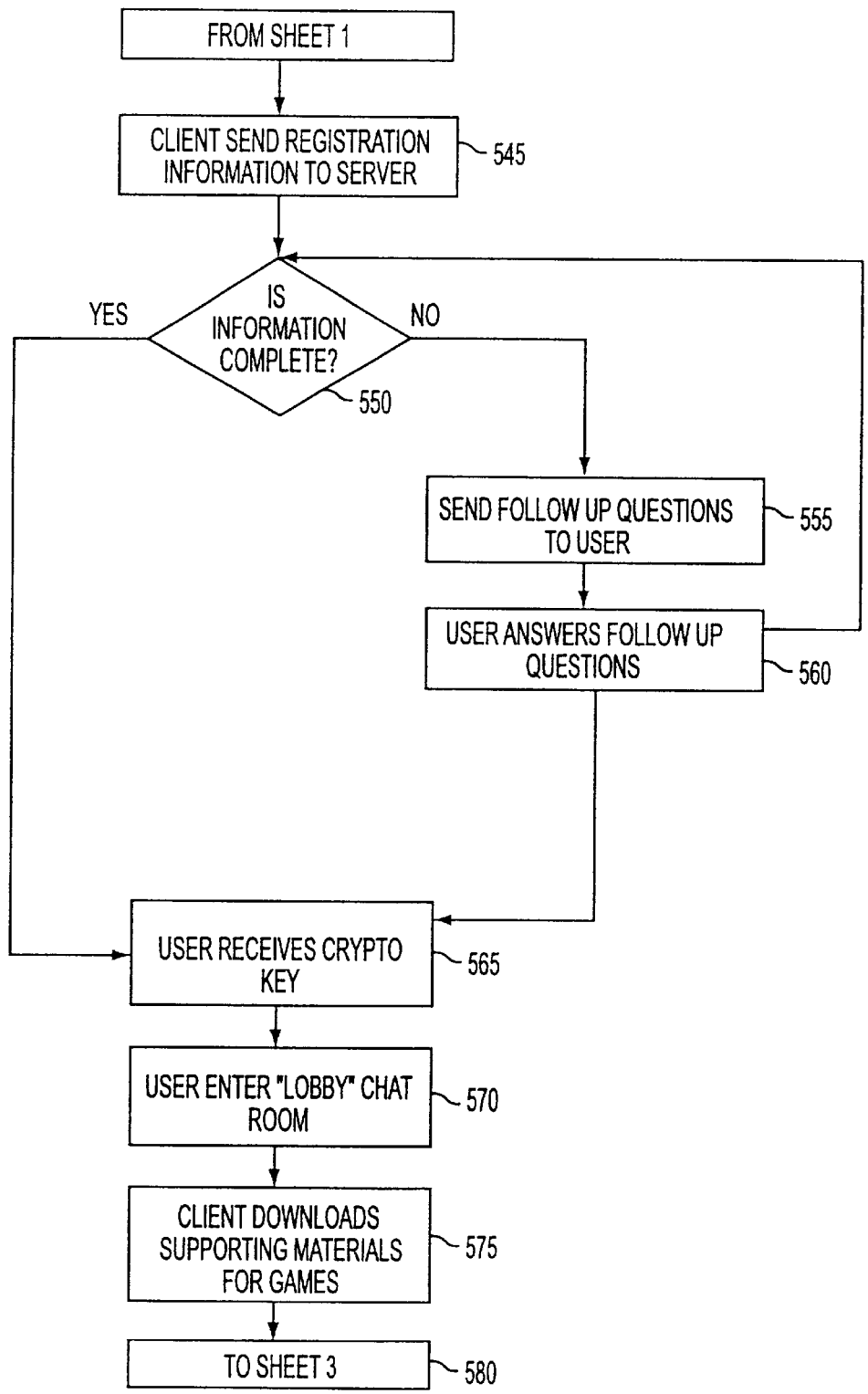
Figures 3, 8A:
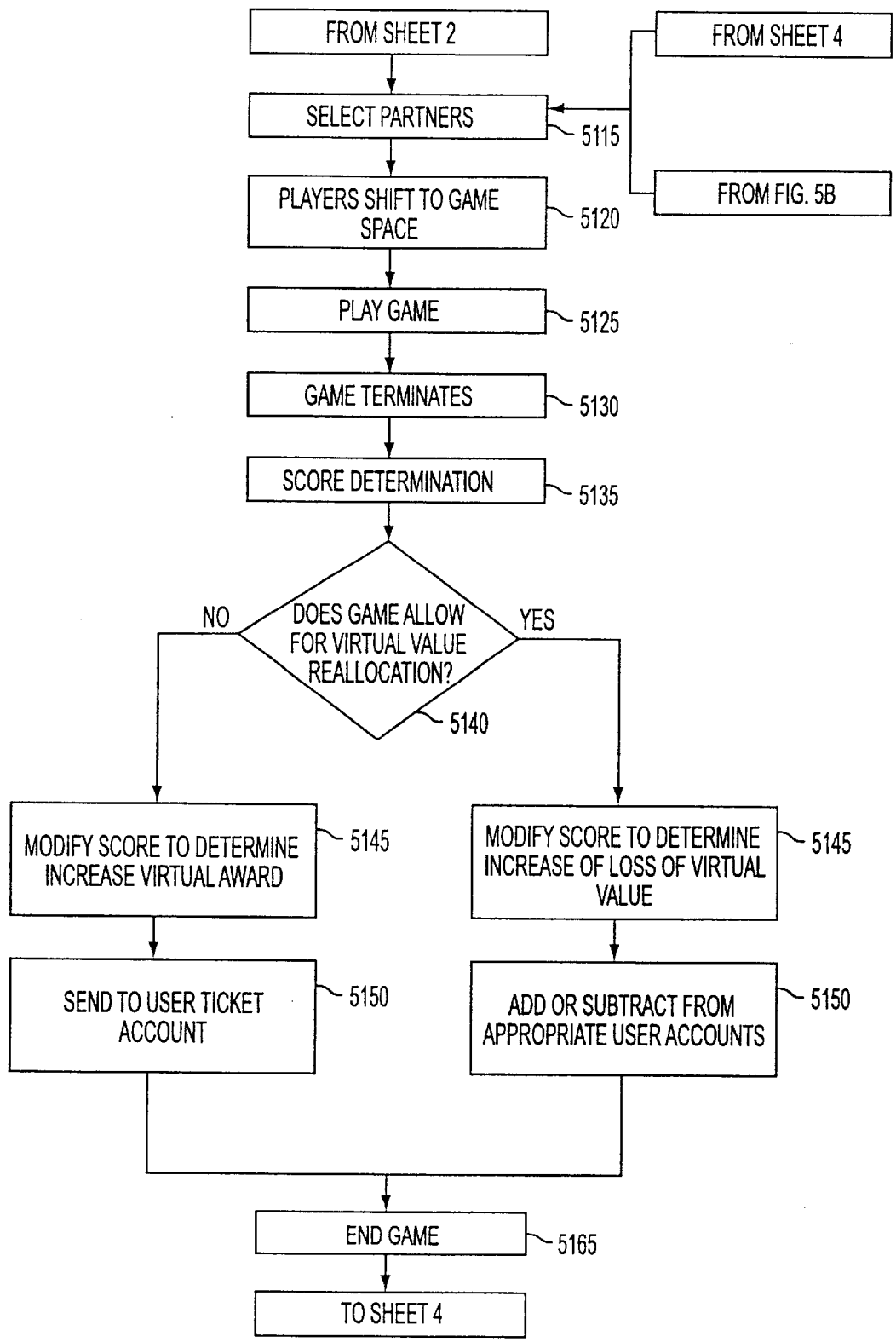
Figures 4, 8A:
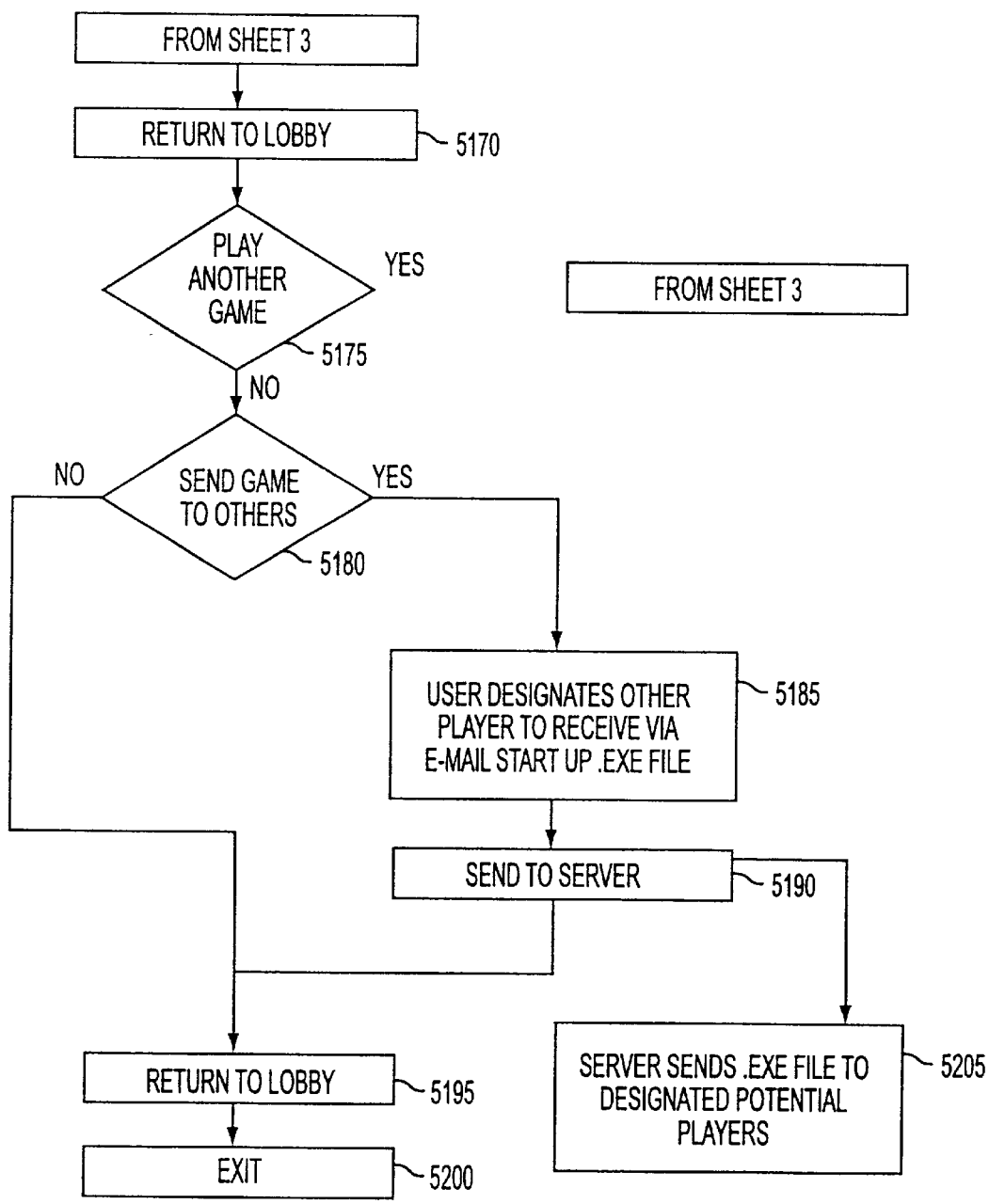

FIG. 8A illustrates the detailed process for game play according to a preferred embodiment of the present invention. First, the user receives a copy of an invitation application from some other party as described previously (step 500). At this point, the user may, at his or her option, decide to authenticate the invitation application. Depending upon the source of the application, the user may wish to ensure that the original source of the invitation application is from the service provider operating central controller module 115 (or some other legitimate source). In the event the user does not desire to authenticate the invitation application, processing continues at step 530, discussed below.

Otherwise, if the user does desire to authenticate the invitation application, processing continues at step 511. At step 511, the user may use a browser application (or some alternate means such as, for example FTP) to locate a website or other server storing a verification application. In one embodiment, the user enters the URL for the website (which may be stored at central controller module 115 or some other server). Once the connection with central controller module 115 (or another authenticating server) is established, the verification application is downloaded to client 110 at step 512. The user then executes the verification application locally and specifies the location of the invitation application being verified (step 513). In an embodiment of the invention, verification occurs using the MD-5 checksum algorithm of RSA. As a result, a checksum is generated based upon the coding of the application object. The checksum generated is transmitted to central controller module 115 (or other authenticating server) for comparison with known checksums for various invitation applications and versions thereof. At step 514, the website or authenticating server transmits a verification status to client 110 indicative of the verification results. If the checksums match, the website or authenticating server will transmit a response message indicating that the application object is valid. Otherwise, the response indicates that the application object may be invalid.

At step 520, if the response is indicative of an invalid invitation application, the user is alerted of the same via a message to client 110 at step 525 and the process terminates. Alternatively, if the invitation application is verified, the user is alerted of successful verification through a message at client 110 (step 518). In a preferred embodiment, the user next launches the invitation application (e.g. the executable component) which establishes a connection with central controller module 115. Central controller module 115 immediately initiates the community, or "lobby," executable and the user is placed in the community chat room (530). According to another embodiment, a user may be presented a dialog box instead of being placed in a chat room. The lobby serves as the entry point into the gaming environment. Alternatively, it is possible for the verification invitation application to be designed to automatically invoke the connection and launch the application upon successful verification.

In either case, on the user's first visit, the user is prompted to register, and does register with the service via central controller at steps 535 and 540 so that information can be gathered as necessary prior to game play. A registration form (or other means for providing the requested information) is completed by the user and may then be sent by client 110 to central controller module 115 at step 545. Information completeness is checked at step 550. If the information provided by the user is incomplete, follow-up questions may be sent to the user at step 555. The user then provides answers to follow-up questions 560. This process is repeated until the user furnishes the minimum data requirement pre-selected as a requirement for game play. Once the requisite information is funished, the user is considered a "valid user" (e.g. to have joined a community) and a cryptographic key is transmitted to client 110 permitting user to access the applications objects and the community. The cryptographic key is used in connection with cryptography applications 320 to control access to application objects and resources resident on central controller module 115.

The user next enters the community at step 570. The community includes a chat room and permits the user to select, via various buttons, hyperlinks, pull down menus, etc, other chat rooms application objects, and/or the application/game in which the user wishes to participate. In order to participate in a particular application/game, the user should preferably maintain a local copy of the application/game at client 110. In some cases, the user will receive the application/game as part of an invitation application emailed to him or her as discussed above. Alternatively, the user can download the application/game from a website or from central controller module 115. According to an embodiment of the invention, applications/games are downloaded while the user completes the registration form. Control may be established such that central controller module 115 preferably will not permit a user to select an application/game which is determined not to be locally resident at user's client. This control may be established by, for example, tracking downloads of applications to particular registered users or verifying the presence of the application on the local client immediately prior to application execution when requested by the user.

Assuming the user has been authorized and is determined to maintain a local copy of the application, client 110 may be instructed by central controller module 115 to download with a client application art and/or other supporting files such as graphics, game engines, audio files, etc for the selected game/application (step 575). Particular files, characters and game elements may also be cached locally at client 110 for rapid access during game play.

The user then selects playing partners at step 5115. Partners may be selected through the chat application with, for example, pull down menus or simultaneous player transfer to a specific chat room intended for a particular game or application. Partners may also be selected in other areas of a community. In the latter case, the players shift to a game space (specialized form of chat room) at step 5120. The game is then played by the players under the control of central controller module 115 at step 5125. Upon completion of the game, whether by player actions, time limitations or other predetermined criteria for game termination, central controller module 115 terminates the game at step 5130. At step 5135, a score for a game is determined.

Certain games are configured for "virtual value reallocation" based upon the results of game play. A determination is made at step 5140 as to whether the game just played is one such game. Prior to game play, a user may purchase a certain amount of "virtual value" or "tickets" for game play. Players may alternatively or additionally obtain virtual value from invitation applications emailed to them. Upon game completion, the amount of virtual value in a player's account may be decremented in return for game play. Additionally, if a game is configured for "virtual value reallocation", a game winner may receive some of the virtual value present in the loser's account.

If virtual value reallocation is supported, then the right branch of the decision box at step 5140 is followed. In this case, the amount of reallocation is determined at step 5155. This may be based upon a score differential or may be a fixed number per game. In step 5160, each of the winners and losers accounts are adjusted. In the event of more than two players, various algorithms can be used to reallocate virtual value among all accounts. If the left path at step 5140 is followed (i.e. no virtual value reallocation), in one embodiment, it is possible at step 5145 to award some amount of virtual value to selected players based upon game play. That value is updated in the player's account at step 5150. The virtual value processing ends at step 5165.

Following this, a user may return to the announcements screen or another chat room of the community at step 5170. The user can then decide to play the same game again, to play another game or to not play any more games. This decision is made at step 5175. If the user decides to play another game or the same game again, the user returns to step 5115 where he or she selects partners and repeats the process previously described above. If the user decides not to play any more games at step 5175, the user may determine whether to send a game, and a community, to others at step 5180. If not, the user can return to the announcements screen of a community at step 5195 and exit at step 5200. Alternatively, if the user desires, he or she can designate email addresses (as well as possibly some additional data) for potential new users at step 5185. The user can also designate particular games and/or other applications which may be of interest to the potential users. The email addresses and other information are collected by central controller at step 5190, which then may store the data in inquiry database 360 or some other database. Following this, an invitation application with the designated games (and/or other applications) may be emailed to designated potential users 5205. Following this step, the user may return to the Lobby at step 5195 and exits the process at step 5200.

Figure 8B:
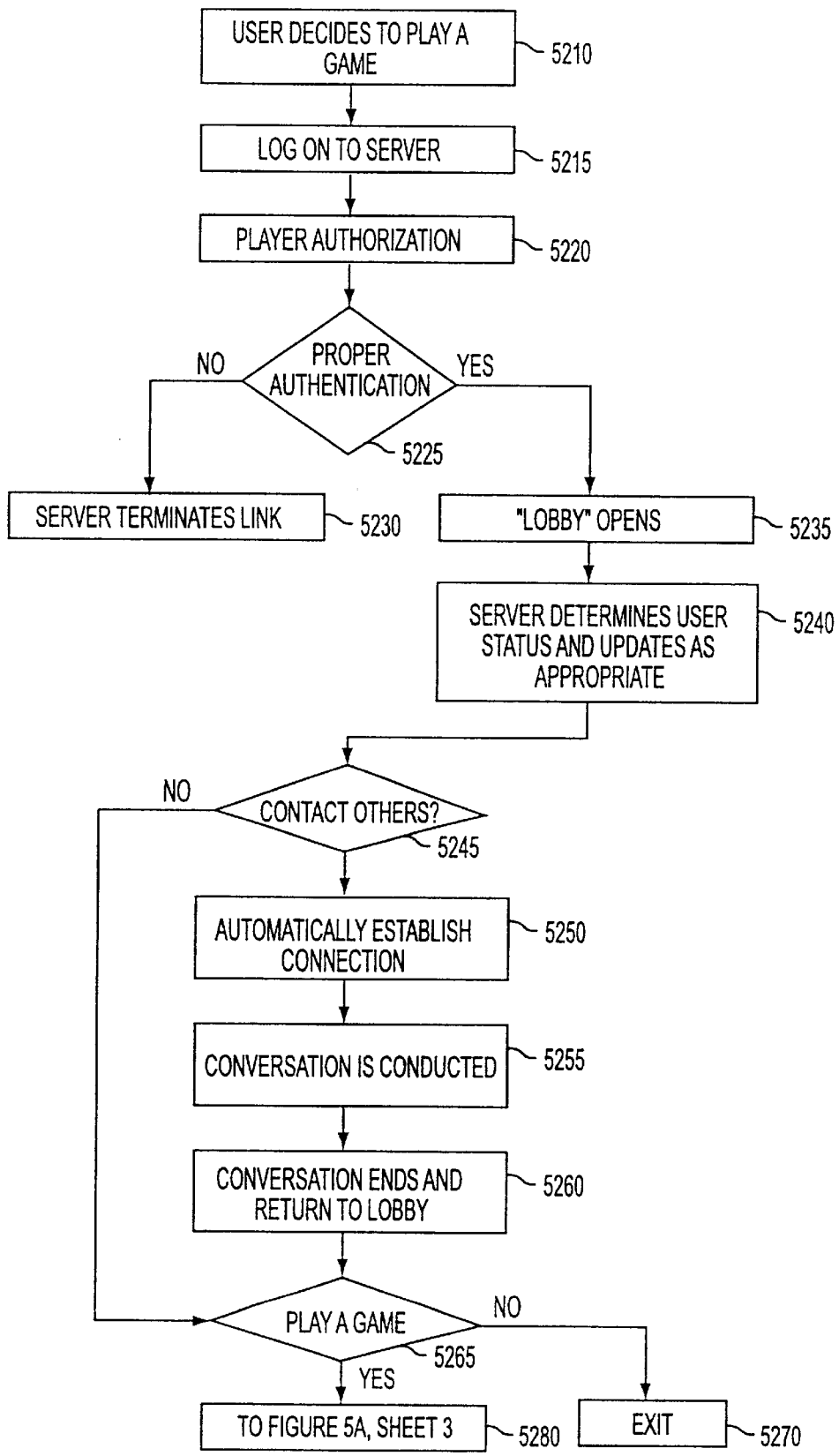

FIG. 8B illustrates the process for game play in the event that a user returns to the service under the control of central controller module 115 for a play a second or subsequent time (i.e. the user has already established an account). The user decides to play a game at step 5210. Next, the user logs on to central controller module 115 at step 5215. Central controller module 115 next determines if the user is an accredited user (e.g. is a member of a community) based upon a previously set up account at step 5225. If not, central controller module 115 terminates the link at step 5230, or may redirect the user to locations where he may set up an account. Central controller may also issue a message to the user indicating the problem and/or what the user must do to properly set up an account. If the user is properly authenticated, central controller module 115 places the user in the lobby at step 5235. At this time, central controller module 115 may also determine the status of the player's invitation application and the associated executable component and provide updates/upgrades as needed at step 5240.

After this is completed, the user decides if he or she wishes to establish email/chat contact with others at step 5245. If so, the application object under the control of central controller module 115 automatically establishes contact with designated other users at step 5250 by locating other individuals if they are present in system chat rooms. Following this, conversation in chatroom is accomplished at step 5255. Upon termination of the chat, the user returns to the announcements tab of the community at step 5260. The user then decides whether to play a game at step 5265. If not, the user can then exit at step 5270. Otherwise, if the user desires to play a game, the user proceeds, at step 5265, to step 5115 in FIG. [8A] to proceed with game set up and play as described above.

Figure 9:
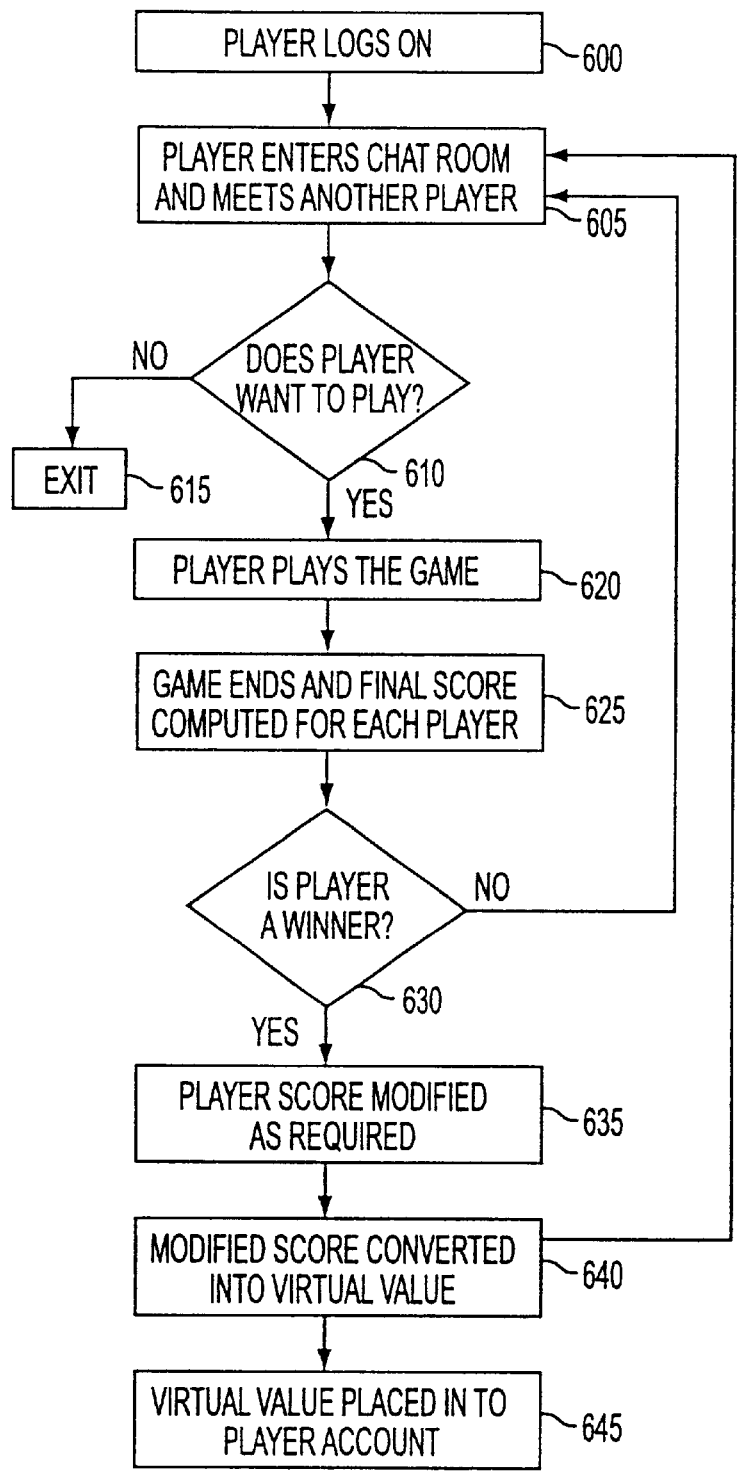
FIG. 9 is a flowchart illustrating the detailed process of game play in a preferred embodiment of the invention.

FIG. 9 illustrates the specific steps involved in game play. The user logs on to a community, if already not logged on, to initiate a game at step 600. The user enters, in the community, the chat room associated with the particular game or application and meets other potential players or "application partners" at step 605. The user then decides whether or not to play a game at step 610. The user can exit at step 620 or play a game at step 610. The user then plays the game at step 620. At game completion or stop at step 625, a final score is computed for each player. If a player is a winner, he or she may be awarded ticket(s) at step 635 depending on the final score (which may be modified by a special game routine depending on the game). If the player is not a winner, then the player may be returned to the chat room at step 605.

Figure 10:
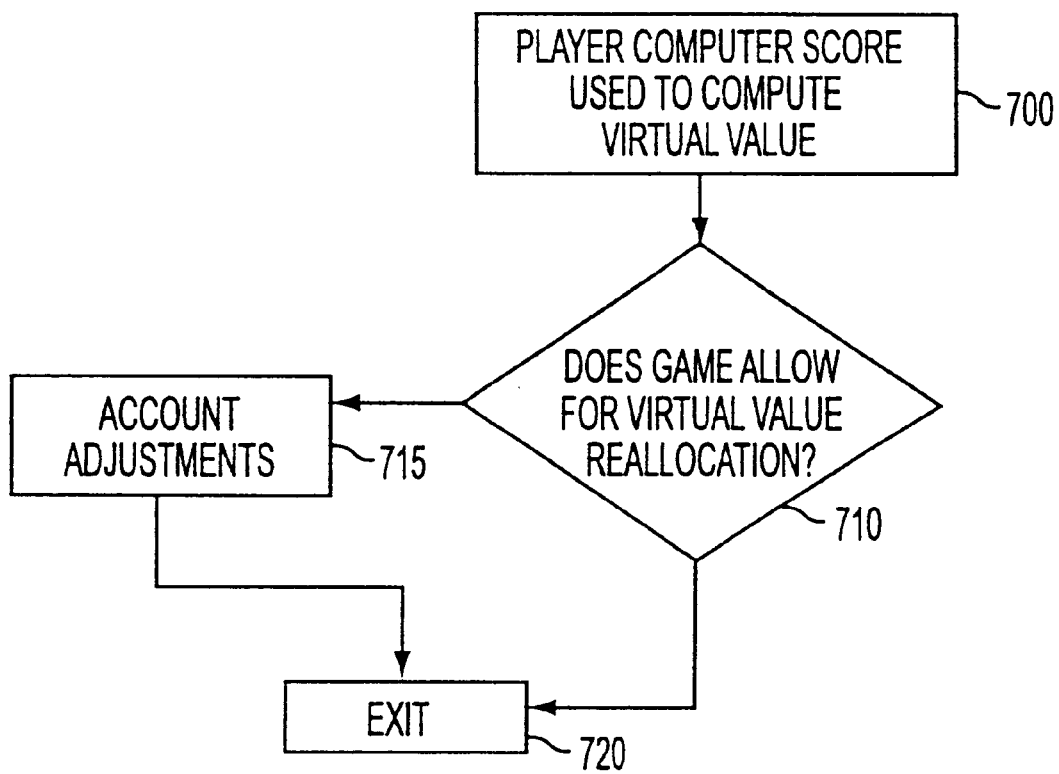
FIG. 10 is a flowchart illustrating the detailed process of virtual value ticket account control according to a preferred embodiment of the invention.

FIG. 10 is a flow chart illustrating the detailed process of virtual value ticket account control. As discussed above, based upon game play results, players may "win" virtual value tickets that may be redeemed for prizes, merchandise, services or additional game play. At step 700, the player's game scores are used to compute a virtual value. Various algorithms may be used to correlate game score to virtual value. For example, a player might receive a virtual value which equals his game score (points) multiplied by some multiple such as one-tenth. Next, at step 710, IADS 100 makes a determination as to whether the game just played is configured for "virtual value reallocation". As discussed above, if the game is configured as such, player's accounts are adjusted based upon game play. In other words, one player's account may be decremented (the loser) while another player's account may be incremented (the winner) (step 715). In a preferred embodiment, the number of total virtual value in the player's collective accounts remains constant. Value is merely shifted from one account to another based upon game play. Following account adjustment at step 715 or in the event the game is not configured for virtual value adjustments (i.e. game configured just to award virtual value to selected players or do nothing at the end of game play), the process exits at step 720.

Figure 11:
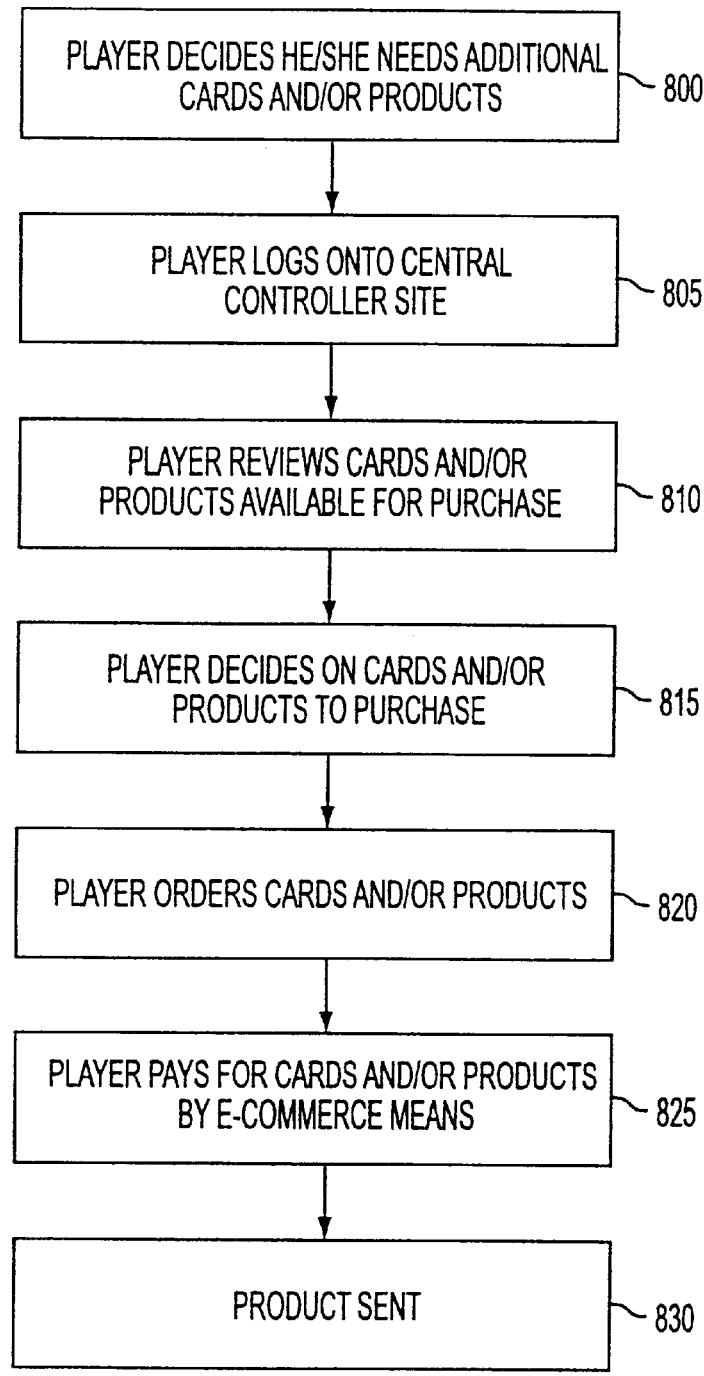
FIG. 11 is a flowchart illustrating the detailed process involved in a product purchase using the IADS in a preferred embodiment of the invention.

FIG. 11 is a flowchart illustrating the steps that may be taken by IADS 100 in connection with a user response in the case where a user desires to purchase a product. In step 800, the user decides that he or she would like to purchase a product using IADS 100. It will be noted that IADS 100, in the context of game play, is particularly well suited for vending "cards" which are elements of game play. In this case, when a user purchases cards as described below, central controller module 115 "enables" the cards purchased with respect to the user as a result of the purchase. Thus, information stored at data storage modules 160 indicates which "cards" or other game elements each player is entitled to use.

Returning to FIG. 11, at step 805, the user establishes a connection to a community with central controller 805. This can be accomplished through the use of an invitation application object as described above or through browser access to an appropriate website. At step 810,the user reviews the cards and/or products available for purchase. According to an embodiment of the invention, products may be selected by an administrator based on the relevance of the products to the community. As described above, an administrator may view various products associated with games. Selected products may be placed in a store in a community. A user may review the selected products. At step 815, the user decides which products and/or cards to purchase. At steps 820, 825, and 830 the user employs traditional e-commerce technology to pay for and initiate the order fulfillment process. If products are ordered from a third party vendor, central controller module 115 may transmit a message (according to an agreed protocol) to the appropriate vendor detailing the order via Network 150. According to an embodiment of the invention, a appropriate application object (e.g. a shopping cart application object) may facilitate a user purchasing a product.

According to an embodiment of the invention, a store, such as through Community Store Function 3050 on graphic user interface 3000 (FIG. 4) may be accessed by a user. A community administrator may view and select items to be placed in the store, such as in the present embodiments, cards, books, other games, game accessories, and/or other products associated with a game. A user may review products, such as cards, at step 810, and decide which cards to purchase at step 815. Ordering cards, at step 820, and paying for cards, at step 830, may be performed through the community. Other manners of using a store may also be used.

The preferred embodiment of this feature of IADS 100 provides access to central controller module 115 via a user interface or other order entry system which interfaces through a community with vendors' fulfillment system. Virtual value (tickets) stored in a user's account may be used to make purchases resulting in a decrement of "virtual value" in the user's account. Cash payments may also be made via a secure encryption payment system, such as RSA, SSL, or SET. Those skilled will recognize that this payment and fulfillment can alternatively be made via other payment and fulfillment systems.

According to another embodiment of the invention, a computer usable medium having computer readable program code embodied therein for interaction in and creation of may be provided. For example, the computer usable medium may comprise a CD ROM, a floppy disk, a hard disk, or any other computer usable medium. One or more of the modules of a system may comprise computer readable program code that is provided on the computer usable medium such that when the computer usable medium is installed on a computer system, those modules cause the computer system to perform the functions described.

According to one embodiment central controller module 115, user interface module 125, link application module 130, processor module 140, memory module 170, communication application module 155, user interface module 25, community creating module 165, invitation module 175, communication module 180 application platform 404, session controller module 406, governor server module 408, application controller modules 410, and subscription objects module 412 may comprise computer readable code that, when installed on a computer, perform the functions described above. Also, only some of the modules may be provided in computer readable code.

According to one specific embodiment of the present invention, system 100 may comprise components of a software system. System 100 may operate on a network and may be connected to other systems sharing a common database. Other hardware arrangements may also be provided.

Other embodiments uses and advantages of the present invention will be apparent to those skilled in the art from consideration of the specification and practice of the invention disclosed herein. The specification and examples should be considered exemplary only. The intended scope of the invention is only limited by the claims appended hereto.

We claim:

1. A method for creating a community for users with common interests to interact in, the method comprising the steps of:

receiving a creation transmission from a registered user, the creation transmission indicating that the registered user desires to create a community;

receiving community identification information from the registered user;

receiving a selection of at least one application object from the registered user;

creating a community based on the community identification information and the at least one application object;

receiving at least one communications address designated by the registered user, the at least one communications address corresponding to a user to receive a created community; and transmitting the created community based in part on the at least one communications address.

2. The method according to claim 1, wherein the step of transmitting the created community further comprises transmitting the created community and a user interface.

3. The method according to claim 1, wherein the at least one communications address is an e-mail address.

4. The method according to claim 1, wherein the selected at least one application object comprises at least one of:
   a) chat application object;
   b) an instant message application object;
   c) a white board application object;
   d) a shopping cart application object;
   e) an invitation application object;
   f) a creation application object;
   g) a photo album application object;
   h) a store application object;
   i) a calendar application object;
   j) a video conferencing application object;
   k) a voice chat application object;
   l) an e-mail list application object;
   m) a bulletin board application object; and
   n) a pals application object.

5. The method according to claim 1, further comprising the step of receiving a selection to subscribe to at least one subscription object, wherein the at least one subscription object is accessed through one of the at least one application object.

6. The method according to claim 5, wherein the at least one subscription object is published by at least one of:
   a) at least one other community;
   b) at least one other user; and
   c) at least one vendor.

7. The method according to claim 5, wherein accessing the at least one subscription object through the one of the at least one application object maintains all of the original features of the subscription object.

8. The method according to claim 1, wherein community information further comprises community fields, whereby the community presents to a user at least at least one of:
   a) at least one other user having user fields;
   b) at least one other community having community fields; and
   c) at least one vendor product having vendor fields;
      wherein the presentation is based in part on a comparison of user fields, community fields and vendor fields.

9. A system for creating a community for users with common interests to interact in comprising:
   a receiver module for receiving:
      a) a creation transmission from a registered user, the creation transmission indicating that the registered user desires to create a community;
      b) receiving community identification information from the registered user;
      c) receiving a selection of at least one application object from the registered user; and
      d) at least one communications address designated by the registered user, the at least one communications address corresponding to a user to receive a created community;
   a creation module for creating a community based on the community identification information and the at least one community function; and
   a transmitter for transmitting the created community based in part on the at least one communications address.

10. The system according to claim 9, wherein transmitting the created community comprises transmitting the created community and a user interface.

11. The system according to claim 9, wherein the at least one communications address is an e-mail address.

12. The system according to claim 9, wherein the selected at least one application object comprises at least one of:
   a) chat application object;
   b) an instant message application object;
   c) a white board application object;
   d) a shopping cart application object;
   e) an invitation application object;
   f) a creation application object;
   g) a photo album application object;
   h) a store application object;
   i) a calendar application object;
   j) a video conferencing application object;
   k) a voice chat application object;
   l) an e-mail list application object;
   m) a bulletin board application object; and
   n) a pals application object.

13. The system according to claim 9, further comprising a subscription module for subscribing to at least one subscription object, wherein the at least one subscription object is accessed through one of the at least one application object.

14. The method according to claim 13, wherein the at least one subscription object is published by at least one of:
   a) at least one other community;
   b) at least one other user; and
   c) at least one vendor.

15. The system according to claim 13, wherein accessing the at least one subscription object through the one of the at least one application object maintains all of the original features of the subscription object.

16. The system according to claim 9, wherein community information further comprises community fields, whereby the community presents to a user through the community at least at least one of:
   a) at least one other user having user fields;
   b) at least one other community having community fields; and
   c) at least one vendor product having vendor fields;
      wherein the presentation is based in part on a comparison of user fields, community fields and vendor fields.

17. A method for creating a community for users with common interests to interact in, the method comprising the steps of:

transmitting a creation transmission, the creation transmission indicating the desire to create a community;

transmitting community identification information;

transmitting at least one communications address corresponding to a user to receive the created community; and selecting at least one application object for inclusion in the community, whereby the community is created based on the community identification information and the at least one application object.

18. The method according to claim 17, wherein the created community includes a user interface.

19. The method according to claim 17, wherein the at least one communications address is an e-mail address.

20. The method according to claim 17, wherein the selected at least one application object comprises at least one of:
   a) chat application object;
   b) an instant message application object;
   c) a white board application object;
   d) a shopping cart application object;
   e) an invitation application object;
   f) a creation application object;
   g) a photo album application object;
   h) a store application object;
   i) a calendar application object;
   j) a video conferencing application object;
   k) a voice chat application object;
   l) an e-mail list application object;
   m) a bulletin board application object; and
   n) a pals application object.

21. The method according to claim 17, further comprising the step of subscribing to at least one subscription object for inclusion in the community, wherein the at least one subscription object is accessed through one of the at least one application object.

22. The method according to claim 21, wherein the at least one subscription object is published by at least one of:
   a) at least one other community;
   b) at least one other user; and
   c) at least one vendor.

23. The method according to claim 21, wherein accessing the at least one subscription object through the one of the at least one application object maintains all of the original features of the subscription object.

24. The method according to claim 17, wherein community information further comprises community fields, whereby the community presents to a user at least at least one of:
   a) at least one other user having user fields;
   b) at least one other community having community fields; and
   c) at least one vendor product having vendor fields;
      wherein the presentation is based in part on a comparison of user fields, community fields and vendor fields.

25. A system for creating a community for users with common interests to interact in, the system comprising:
   a transmitter module for transmitting:
      a) a creation transmission, the creation transmission indicating the desire to create a community;
      b) community identification information;
      c) at least one communications address corresponding to a user to receive the created community; and
      d) a selection of at least one application object for inclusion in the community, whereby the community is created based on the community identification information and the at least one application object; and
   a display module for displaying prompts for the community identification information, the at least one communications address, and the selection of at least one application object.

26. The system according to claim 25, wherein the created community includes a user interface.

27. The system according to claim 25, wherein the at least one communications address is an e-mail address.

28. The system according to claim 25, wherein the selected at least one application object comprises at least one of:
   a) chat application object;
   b) an instant message application object;
   c) a white board application object;
   d) a shopping cart application object;
   e) an invitation application object;
   f) a creation application object;
   g) a photo album application object;
   h) a store application object;
   i) a calendar application object;
   j) a video conferencing application object;
   k) a voice chat application object;
   l) an e-mail list application object;
   m) a bulletin board application object; and
   n) a pals application object.

29. The system according to claim 25, wherein the transmitter module further transmits the selection of subscribing to at least one subscription object for inclusion in the community, wherein the at least one subscription object is accessed through one of the at least one application object.

30. The system according to claim 29, wherein the at least one subscription object is published by at least one of:
   a) at least one other community;
   b) at least one other user; and
   c) at least one vendor.

31. The system according to claim 29, wherein accessing the at least one subscription object through the one of the at least one application object maintains all of the original features of the subscription object.

32. The system according to claim 25, wherein community information further comprises community fields, whereby the community presents to a user at least at least one of:
   a) at least one other user having user fields;
   b) at least one other community having community fields; and
   c) at least one vendor product having vendor fields;
      wherein the presentation is based in part on a comparison of user fields, community fields and vendor fields.

* * * * *

(12) INTER PARTES REEXAMINATION CERTIFICATE (974th)
United States Patent
Harvey et al.

(10) Number: US 6,519,629 C1
(45) Certificate Issued: Oct. 24, 2014

(54) SYSTEM FOR CREATING A COMMUNITY FOR USERS WITH COMMON INTERESTS TO INTERACT IN

(75) Inventors: Jamey Harvey, Reston, VA (US);
Andrew Fegly, Falls Church, VA (US);
Matt Hulan, Rockville, MD (US);
Robert Dekelbaum, Silver Spring, MD (US)

(73) Assignee: Cross Atlantic Capital Partners, Inc., Herndon, VA (US)

Reexamination Request:
No. 95/001,070, Jul. 21, 2008

Reexamination Certificate for:
Patent No.: 6,519,629
Issued: Feb. 11, 2003
Appl. No.: 09/968,386
Filed: Oct. 2, 2001

Related U.S. Application Data

(60) Division of application No. 09/513,844, filed on Feb. 25, 2000, now Pat. No. 6,487,583, which is a continuation-in-part of application No. 09/264,988, filed on Sep. 15, 1998, now abandoned.

(51) Int. Cl.
*A63F 13/12* (2006.01)
*H04L 29/08* (2006.01)
*H04L 12/18* (2006.01)

(52) U.S. Cl.
USPC .................. 709/204; 709/203; 709/217

(58) Field of Classification Search
None
See application file for complete search history.

(56) References Cited

To view the complete listing of prior art documents cited during the proceeding for Reexamination Control Number 95/001,070, please refer to the USPTO's public Patent Application Information Retrieval (PAIR) system under the Display References tab.

*Primary Examiner* — Deandra Hughes

(57) ABSTRACT

An Information and Application Distribution System (IADS) is disclosed. The IADS operates, in one embodiment, to distribute, initiate and allow interaction and communication within like-minded communities. Application distribution occurs through the transmission and receipt of an "invitation application" which contains both a message component and an executable component to enable multiple users to connect within a specific community. The application object includes functionality which allows the user's local computer to automatically set up a user interface to connect with a central controller which facilitates interaction and introduction between and among users.

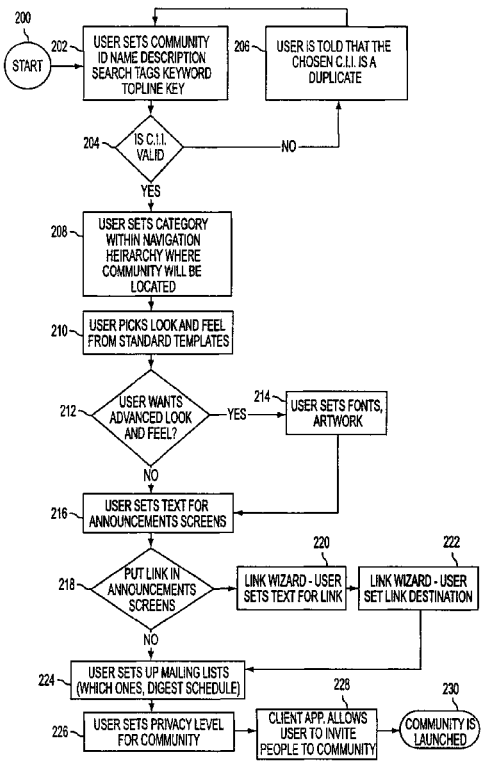

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-32 are cancelled.

* * * * *